US011842724B2

(12) United States Patent
Liang et al.

(10) Patent No.: US 11,842,724 B2
(45) Date of Patent: *Dec. 12, 2023

(54) EXPANDABLE DIALOGUE SYSTEM

(71) Applicant: Microsoft Technology Licensing, LLC, Redmond, WA (US)

(72) Inventors: Percy Shuo Liang, Palo Alto, CA (US); David Leo Wright Hall, Berkeley, CA (US); Joshua James Clausman, Somerville, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 65 days.

This patent is subject to a terminal disclaimer.

(21) Appl. No.: 17/457,854

(22) Filed: Dec. 6, 2021

(65) Prior Publication Data
US 2022/0093081 A1 Mar. 24, 2022

Related U.S. Application Data

(63) Continuation of application No. 16/802,356, filed on Feb. 26, 2020, now Pat. No. 11,195,516, which is a
(Continued)

(51) Int. Cl.
*G10L 15/22* (2006.01)
*G10L 15/06* (2013.01)
(Continued)

(52) U.S. Cl.
CPC ............ *G10L 15/063* (2013.01); *G06F 3/167* (2013.01); *G06F 16/3329* (2019.01);
(Continued)

(58) Field of Classification Search
CPC ............................... G10L 13/00; G10L 15/22
See application file for complete search history.

(56) References Cited

U.S. PATENT DOCUMENTS 8,572,129 B1 10/2013 Lee et al.
9,812,127 B1 11/2017 Perez et al.
(Continued)

FOREIGN PATENT DOCUMENTS

CN 1417679 A 5/2003
CN 101287042 A 10/2008
(Continued)

OTHER PUBLICATIONS

"Non Final Office Action Issued in U.S. Appl. No. 17/448,289", dated Sep. 29, 2022, 18 Pages.
(Continued)

*Primary Examiner* — Shreyans A Patel
(74) *Attorney, Agent, or Firm* — Alleman Hall Creasman & Tuttle LLP

(57) ABSTRACT

A method for training a dialogue learning model includes presenting, via a user interface of a computing device, an utterance and a list of actions based on the utterance. A selection of an action from the list of actions is received via the user interface. A designated span of the utterance is received via the user interface. The selected action and the designated span of the utterance is provided to a computing system for training the dialogue learning model.

18 Claims, 29 Drawing Sheets

Related U.S. Application Data continuation of application No. 15/904,125, filed on Feb. 23, 2018, now Pat. No. 10,586,530.

(60) Provisional application No. 62/462,736, filed on Feb. 23, 2017.

(51) Int. Cl.

| | | |
|---|---|---|
| *G10L 25/00* | (2013.01) | |
| *G06F 16/332* | (2019.01) | |
| *G06F 40/35* | (2020.01) | |
| *G06F 3/16* | (2006.01) | |
| *G06N 5/025* | (2023.01) | |
| *G10L 15/065* | (2013.01) | |

(52) U.S. Cl.
CPC .............. *G06F 40/35* (2020.01); *G06N 5/025* (2013.01); *G10L 15/065* (2013.01); *G10L 15/22* (2013.01); *G10L 25/00* (2013.01)

(56) References Cited

U.S. PATENT DOCUMENTS

| | | | |
|---|---|---|---|
| 10,163,436 B1 * | 12/2018 | Slifka | ..................... G10L 13/00 |
| 10,586,530 B2 | 3/2020 | Liang et al. | |
| 10,713,288 B2 | 7/2020 | Andreas et al. | |
| 10,762,892 B2 | 9/2020 | Rusak et al. | |
| 10,824,798 B2 | 11/2020 | Liang et al. | |
| 10,896,670 B2 | 1/2021 | Eisenzopf | |
| 10,997,968 B2 | 5/2021 | Wanas et al. | |
| 11,069,340 B2 | 7/2021 | Liang et al. | |
| 11,132,499 B2 | 9/2021 | Liang et al. | |
| 11,195,516 B2 * | 12/2021 | Liang | ..................... G06N 5/025 |
| 11,657,215 B2 | 5/2023 | Liang et al. | |
| 2008/0057922 A1 * | 3/2008 | Kokes | ................... G06F 16/634 455/566 |
| 2013/0124195 A1 | 5/2013 | Ehsani et al. | |
| 2014/0108321 A1 | 4/2014 | Buchanan et al. | |
| 2016/0314158 A1 | 10/2016 | Kelly et al. | |
| 2016/0314791 A1 * | 10/2016 | Wang | ..................... G10L 15/22 |
| 2016/0357872 A1 | 12/2016 | Fader et al. | |
| 2016/0372109 A1 * | 12/2016 | Yeracaris | ............ H04M 3/5166 |
| 2018/0061408 A1 | 3/2018 | Andreas et al. | |
| 2018/0068656 A1 * | 3/2018 | Lehman | .............. G10L 15/1815 |
| 2018/0203833 A1 | 7/2018 | Liang et al. | |
| 2018/0232436 A1 | 8/2018 | Elson et al. | |
| 2018/0246954 A1 | 8/2018 | Andreas et al. | |
| 2018/0261205 A1 | 9/2018 | Liang et al. | |
| 2018/0350349 A1 | 12/2018 | Liang et al. | |
| 2019/0066660 A1 | 2/2019 | Liang et al. | |
| 2019/0103092 A1 | 4/2019 | Rusak et al. | |
| 2020/0193970 A1 | 6/2020 | Liang et al. | |
| 2022/0004702 A1 | 1/2022 | Liang et al. | |

FOREIGN PATENT DOCUMENTS

| | | | | |
|---|---|---|---|---|
| CN | 101536084 A | | 9/2009 | |
| CN | 101939740 A | | 1/2011 | |
| CN | 102236645 A | | 11/2011 | |
| CN | 102750271 A | | 10/2012 | |
| CN | 104871150 A | | 8/2015 | |
| CN | 105068661 A | | 11/2015 | |
| CN | 105122749 A | | 12/2015 | |
| CN | 105359130 A | | 2/2016 | |
| CN | 106255968 A | | 12/2016 | |
| KR | 20130128717 A | | 11/2013 | |
| WO | WO-2016151698 A1 * | | 9/2016 | ......... G06F 17/2785 |

OTHER PUBLICATIONS

"First Office Action and Search report Issued in Chinese Patent Application No. 201880010431.2", dated Nov. 15, 2022, 17 Pages.

"First Office Action and Search Report Issued in Chinese Patent Application No. 201880012230.6", dated Oct. 10, 2022, 11 Pages.

Kalatzis, et al., "Bootstrapping incremental dialogue systems: using linguistic knowledge to learn from minimal data", In Repository of arXiv:1612.00347v1, Dec. 1, 2016, 4 Pages.

Yang, et al., "A Survey on Task-Oriented Dialogue Systems", In Chinese Journal of Computers vol. 43, Issue 10, Oct. 31, 2020, pp. 1862-1896.

"Office Action Issued in Indian Patent Application No. 201917032035", dated Jan. 6, 2022, 7 Pages.

"Notice of Allowance Issued in U.S. Appl. No. 17/448,289", dated Jan. 19, 2023, 9 Pages.

"First Office Action and Search Report Issued in Chinese Patent Application No. 201780067955.0", dated Dec. 1, 2022, 15 Pages.

"Office Action Issued in European Patent Application No. 18751475.7", dated Jun. 28, 2023, 15 Pages.

"Notice of Allowance Issued in Chinese Patent Application No. 201780067955.0", dated May 2, 2023, 3 Pages.

"Notice of Allowance Issued in Chinese Patent Application No. 201880010431.2", dated May 29, 2023, 10 Pages.

"Notice of Allowance Issued in Chinese Patent Application No. 201880012230.6", dated May 22, 2023, 4 Pages.

Zhang, et al., "Summarization of Natural Language Generation", In Journal of Computer Application Research, Aug. 10, 2006, 4 Pages.

"Office Action Issued in Chinese Patent Application No. 201880012230.6", dated Feb. 25, 2023, 12 Pages.

* cited by examiner

FIGURE 28

EXPANDABLE DIALOGUE SYSTEM

CROSS REFERENCE TO RELATED APPLICATIONS

The present application is a continuation from U.S. Non-Provisional patent application Ser. No. 16/802,356 filed Feb. 26, 2020, which is a continuation from U.S. Non-Provisional patent application Ser. No. 15/904,125, filed Feb. 23, 2018, now U.S. Pat. No. 10,586,530, which claims the priority benefit of U.S. Provisional Patent Application No. 62/462,736, filed on Feb. 23, 2017, titled "Expandable Dialogue Systems," the entire disclosures of each of which are hereby incorporated herein by reference for all purposes.

BACKGROUND

Prior art speech generation systems are not expandable in such a way as to allow non-expert administrators to expand the capability of the system. To the contrary, changes and modifications of prior art dialogue systems require significant engineering and developer resources and time. A general problem with goal-oriented dialogue systems, for example, that perform actions in the world (those that query APIs) is that they are bound by constraints on composition and predefined dialogue patterns. Compositionality is important to supporting rich functionality from a few primitives. However, to limit the combinatorial explosion when learning from weak supervision, constrained grammars are typically employed. This means that many meanings are simply not expressible. What is needed is an improved dialogue system that does not require significant engineering resources as in prior art systems when expanding.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method for training a dialogue learning model includes presenting, via a user interface of a computing device, an utterance and a list of actions based on the utterance. A selection of an action from the list of actions is received via the user interface. A designated span of the utterance is received via the user interface. The selected action and the designated span of the utterance is provided to a computing system for training the dialogue learning model.

BRIEF DESCRIPTION OF FIGURES

FIG. 28 illustrates a set of rules generated by the user interfaces of FIGS. 8-25.

DETAILED DESCRIPTION

The present technology provides a system that allows non-engineers administrators, without programming, machine language, or artificial intelligence system knowledge, to expand the capabilities of a dialogue system. The dialogue system may have a knowledge system, user interface, and learning model. A user interface allows non-engineers to utilize the knowledge system, defined by a small set of primitives and a simple language, to annotate a user utterance. The annotation may include selecting actions to take based on the utterance and subsequent actions and configuring associations. A dialogue state is continuously updated and provided to the user as the actions and associations take place. Rules are generated based on the actions, associations and dialogue state that allows for computing a wide range of results.

The expandable dialogue system described herein has advantages over systems of the prior art. Prior art speech generation systems are not expandable in such a way as to allow non-expert administrators to expand the capability of the system. A general problem with goal-oriented dialogue systems, for example, that perform actions in the world (those that query APIs) is that they are bound by constraints on composition and predefined dialogue patterns. Compositionality is important to supporting rich functionality from a few primitives. However, to limit the combinatorial explosion when learning from weak supervision, constrained grammars are typically employed. This means that many meanings are simply not expressible. Some examples that systems generally don't support are 'last week of December' or 'flight getting there at least 2 hours before the game starts'. Even single words like 'flight duration' require composition if only the start and end times are available; in that case, subtraction is required.

Prior dialogue systems do not have problem-solving capabilities. If there are no flights, prior art systems do not suggest alternatives. If there's ambiguity, prior art systems do not ask for clarifications. Prior art systems do not users for important information and handle customer support. Each of these patterns is generally coded as a dialogue pattern in prior art systems and fixed in code. To extend any of these capabilities in prior art systems requires engineers to spend substantial time developing code. There is a long tail of different phenomena, so this approach does not scale to real-world scenarios.

Figure 1:
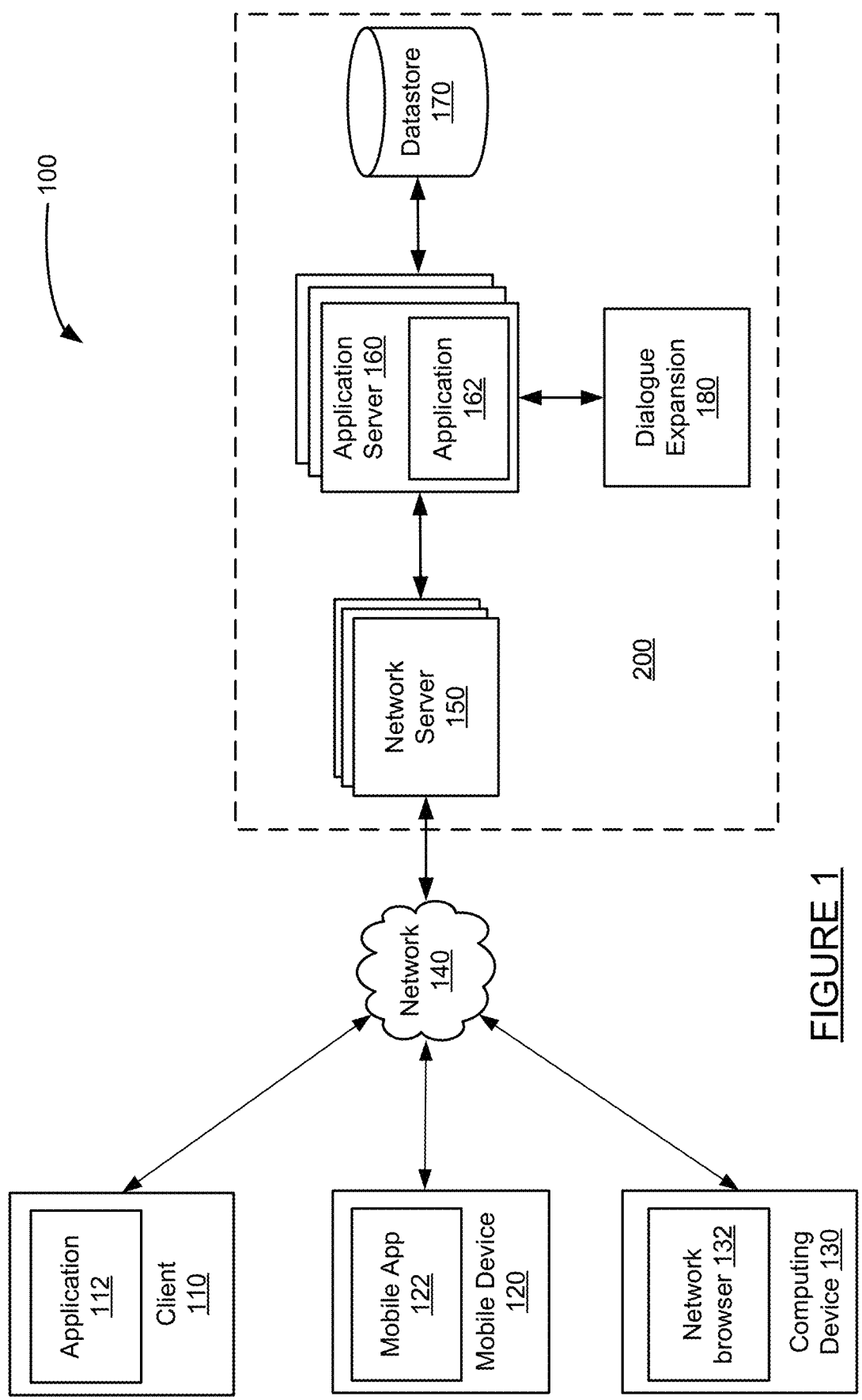
FIG. 1 is a block diagram of a system that implements dialogue expansion.

FIG. 1 is a block diagram of a system for providing an automated assistant that can detect out-of-domain subject matter. System 100 of FIG. 1 includes client 110, mobile device 120, computing device 130, network 140, network server 150, application server 160, and data store 170. Client 110, mobile device 120, and computing device 130 communicate with network server 150 over network 140. Network 140 may include a private network, public network, the Internet, and intranet, a WAN, a LAN, a cellular network, or some other network suitable for the transmission of data between computing devices of FIG. 1.

Client 110 includes application 112. Application 112 may provide an automated assistant, TTS functionality, automatic speech recognition, parsing, domain detection, and other functionality discussed herein. Application 112 may be implemented as one or more applications, objects, modules, or other software. Application 112 may communicate with application server 160 and data store 170 through the server architecture of FIG. 1 or directly (not illustrated in FIG. 1) to access data.

Mobile device 120 may include a mobile application 122. The mobile application may provide the same functionality described with respect to application 112. Mobile application 122 may be implemented as one or more applications, objects, modules, or other software, and may operate to provide services in conjunction with application server 160.

Computing device 130 may include a network browser 132. The network browser may receive one or more content pages, script code and other code that when loaded into the network browser the same functionality described with respect to application 112. The content pages may operate to provide services in conjunction with application server 160.

Network server 150 may receive requests and data from application 112, mobile application 122, and network browser 132 via network 140. The request may be initiated by the particular applications or browser applications. Network server 150 may process the request and data, transmit a response, or transmit the request and data or other content to application server 160.

Application server 160 includes application 162. The application server may receive data, including data requests received from applications 112 and 122 and browser 132, process the data, and transmit a response to network server 150. In some implementations, the network server 152 forwards responses to the computer or application that originally sent the request. Application's server 160 may also communicate with data store 170. For example, data can be accessed from data store 170 to be used by an application to provide the functionality described with respect to application 112. Application server 160 includes application 162, which may operate similarly to application 112 except implemented all or in part on application server 160.

Block 200 includes network server 150, application server 160, and data store 170. Dialogue expansion system 180 is in communication with application 162. The dialogue expansion system may be used to expand dialogue without requiring significant engineering or developer resources and time. Dialogue expansion 180 is discussed in more detail with respect to FIG. 2.

Figure 2:
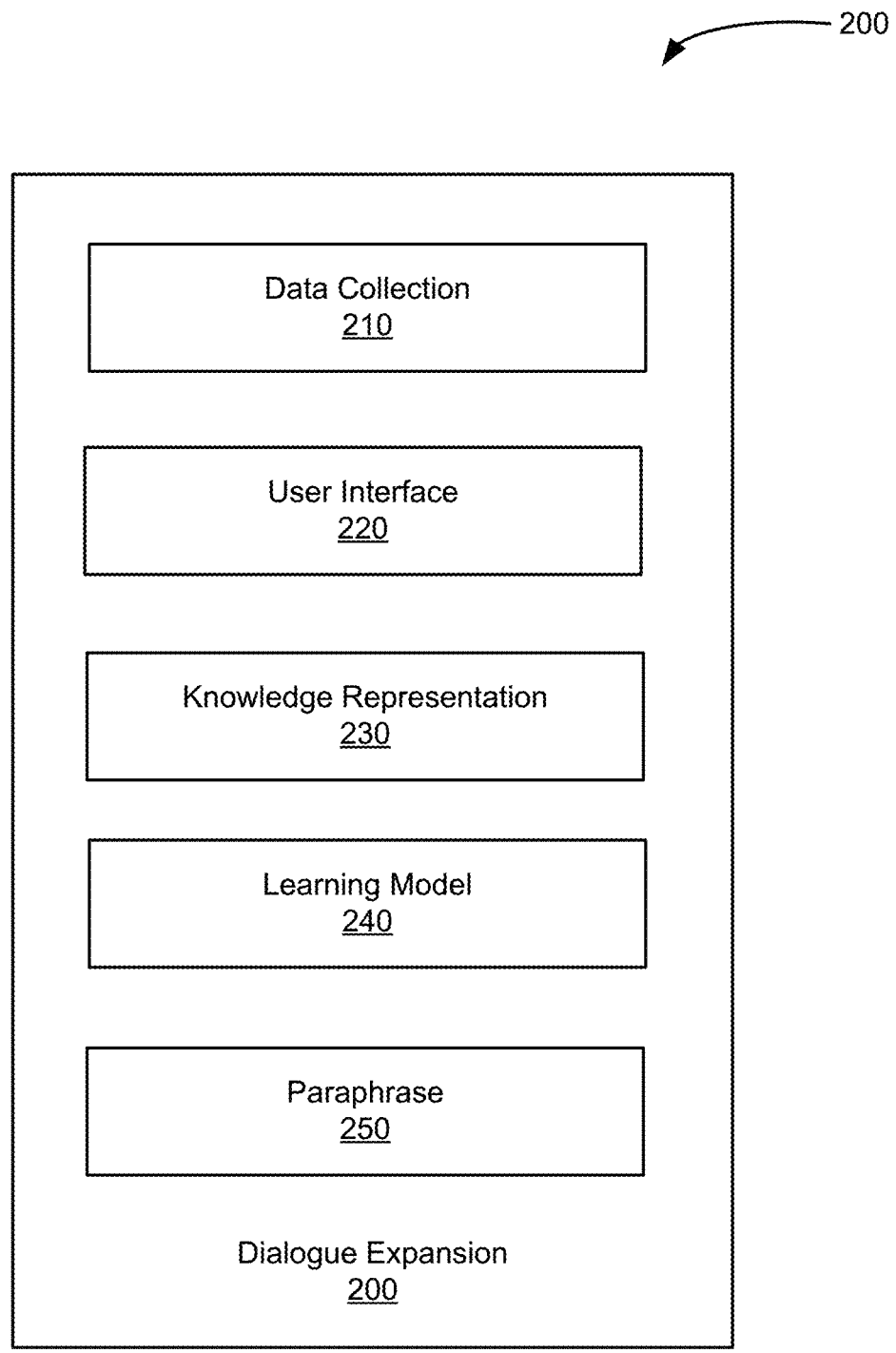
FIG. 2 is a block diagram of an exemplary dialogue expansion system.

FIG. 2 is a block diagram of an exemplary dialogue expansion system. The dialogue expansion system of FIG. 2 provides more details for dialogue expansion 180 of FIG. 1. Dialog expansion 200 of FIG. 2 includes modules data collection 210, user interface 220, knowledge representation 230, learning model 240, and paraphrase 250. Each module of dialog expansion 200 may implement a component of the expandable dialogue system of the present technology.

Data collection module 210 may handle data collection by the expandable dialog system. The data collection may include collecting phrases in a given domain from annotators, collecting dialogue using a subset of phrases or something similar to the phrases, receiving annotations, and receiving and managing paraphrase annotated dialogues.

The user interface module 220 can provide and update a series of interfaces for receiving utterances, input, and other information, creating associations, and configuring actions, thereby allowing non-experts to create dialogues in a simple language. In some instances, a user may provide an utterance, select one or more actions, provide input, set forth associations, and perform other operations through user interface. Examples of user interfaces are discussed with respect to FIGS. 10-27.

Knowledge representation 230 may define a small set of primitives and a simple language that allows for computing a wide range of results. An exemplary knowledge representation module is discussed with respect to FIG. 3.

Learning model 240 can learn from this type of supervision to generalize to new dialogues. An exemplary learning model is discussed with respect to FIG. 3.

Below are a few example actions discussed herein to provide examples of the types of things which exist in the system. Each entry is of the form: action_name(input_1: input_type_1, . . . , input_n: input_type_n): output_type—description of the action create_flight_search( ): FlightSearch—Creates a new flight search for a round trip flight. This encapsulates the parameters for the search to be executed, not the results of the search.

to_entities(text: String): List—Resolves the provided text to a List of entities. The result is a heterogenous List. e.g. to_entities('Georgia') may resolve to a List containing both the state and country of Georgia.

get_airports(city: City): List—Finds the airports for a city. The result is a List of Airports.

get_airport_code(airport: Airport): AirportCode—Looks up the AirportCode for an Airport.

Paraphrase 250 may receive a text output or input and generate different words having a similar or same meaning of the words. The text output or input can be easier processed by a dialogue system or expandable dialogue system In addition to the actions associates with the flights domain, there are also many actions which are shared across domains and are common to achieving complex tasks. These include things such as: arithmetic operators, logical operators, list sort, list filter, list subset, list map and extract abstract path. There are also domains which are common to many applications which have shared functions such as monetary and date operations.

Though the dialog expansion 200 is illustrated with five modules 210-250, more or fewer modules may be included, included nested or sub-modules. Further, though the modules are described as operating to provide or construct the dialog expansion, other functionality described herein may also be performed by the modules. Additionally, all or part of the dialog expansion may be located on a single server or distributed over several servers.

Figure 3:
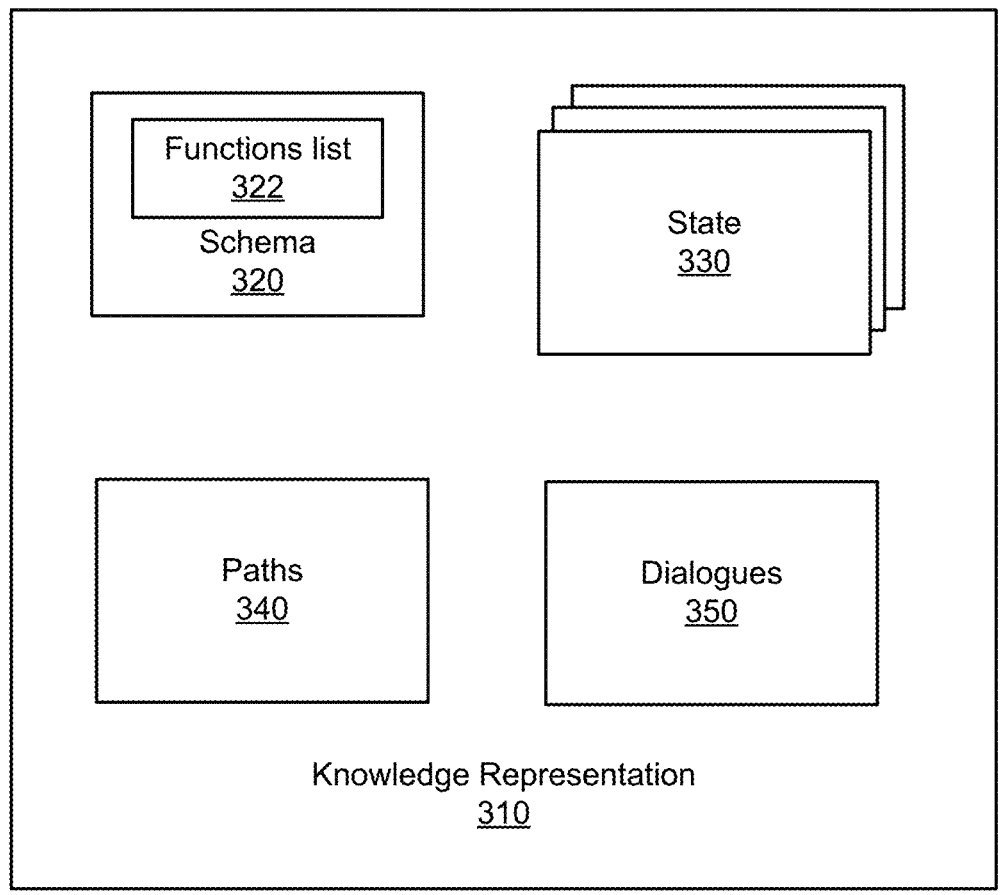
FIG. 3 is a block diagram of an exemplary knowledge representation module.

FIG. 3 is a block diagram of an exemplary knowledge representation 310. The knowledge representation of FIG. 3 provides more detail of module 230 of FIG. 2. The knowledge representation module consists of schema, state data, path, and dialogue data.

Schema 320 can include a list of functions, where each function can include a type signature (tuple of input types and an output type). The functions are primitives used to produce behaviors by a dialogue system. Examples of functions and type signatures include get_country: City→Country;
perform_flight_search: FlightSearch→List; and
concat: List, List→List.

A state 330 is a (list) value, which is either a primitive value such as an integer or a structured value. A structured value can contain an ordered list of fields (name, value) pairs. In some instances, this is used to represent dictionaries (with ordered keys) as well as lists (with null keys). Each state represents a scratchpad that the administrator and agent use to collaboratively construct the common ground and the results of the agent's actions.

A Path 340 is a reference to a particular part of the state (e.g., when the state is implemented as a directory structure where the contents are ordered). Formally, a raw path can be a sequence of indices, such as [0].[0].[1]. When given a state, a path can be rendered by showing types at the top level and field names, such as for example as [0:FlightSearch].parts.[1].

A dialogue consists of a sequence of turns, where each turn consists of who is talking (e.g., an agent or an administrator), an utterance, and a sequence of actions. An utterance may be divided into a sequence of tokens and a set of paraphrases. For example, from the utterance "I'd like to fly to Boston," a sequence of actions may be create_flight_search( ), BOS:AirportCode, and [0:FlightSearch].parts.[0].destinations+=_. Each action takes a state (list of values) and produces another value. Actions may be primitive actions or call actions.

A primitive action (type, contents) adds the value contents with given type (e.g., string, date) to the end of the state (e.g., BOS:AirportCode). A call action (function, in_paths, out_path, append, out_field, condition_path), to a first order approximation, extracts the values sitting at in_paths, passes them as inputs into the function and returns the value.

There are several additional complexities that can be implemented by knowledge module 310. In some instances, if out_path is non-empty, then the present system can take the value at the first element of out_path, and return the version of this that has out_path inside it updated. For example, for [0:FlightSearch].parts[0].latest_departure_time=get_time([1:Datetime]), the present system would take the FlightSearch object, set the latest_departure_time field and then return the object. The present system can maintain immutability.

If append is true, then we append the output of the function for example [0:FlightSearch].parts.[0].departure_dates+=[2:Datetime].

In some instances, the present technology appends not to a list but a structured field, in which case out_field should be filled too.

In some instances, paths can contain wildcards in them, in which the action is applied on all paths that match these. For example, "[0:FlightSearch].parts.*.permitted_airlines+=[4:AirlineCode]" performs the action for all parts of the search. In some instances, terminology may be used that lets the base nodes be the ones matched by the lowest node that contains all the wildcards of out_path.

If condition_path is set, then the present technology can get a Path p from this path, and then perform the action on all base nodes such that following p from the base node leads to a true boolean value.

In summary, the present technology includes a defined programming language which maintains an infinite register machine where each action produces a new value, and any value can be used for later computation. Each action can perform a 'foreach' and an 'if' over base nodes.

Figure 4:
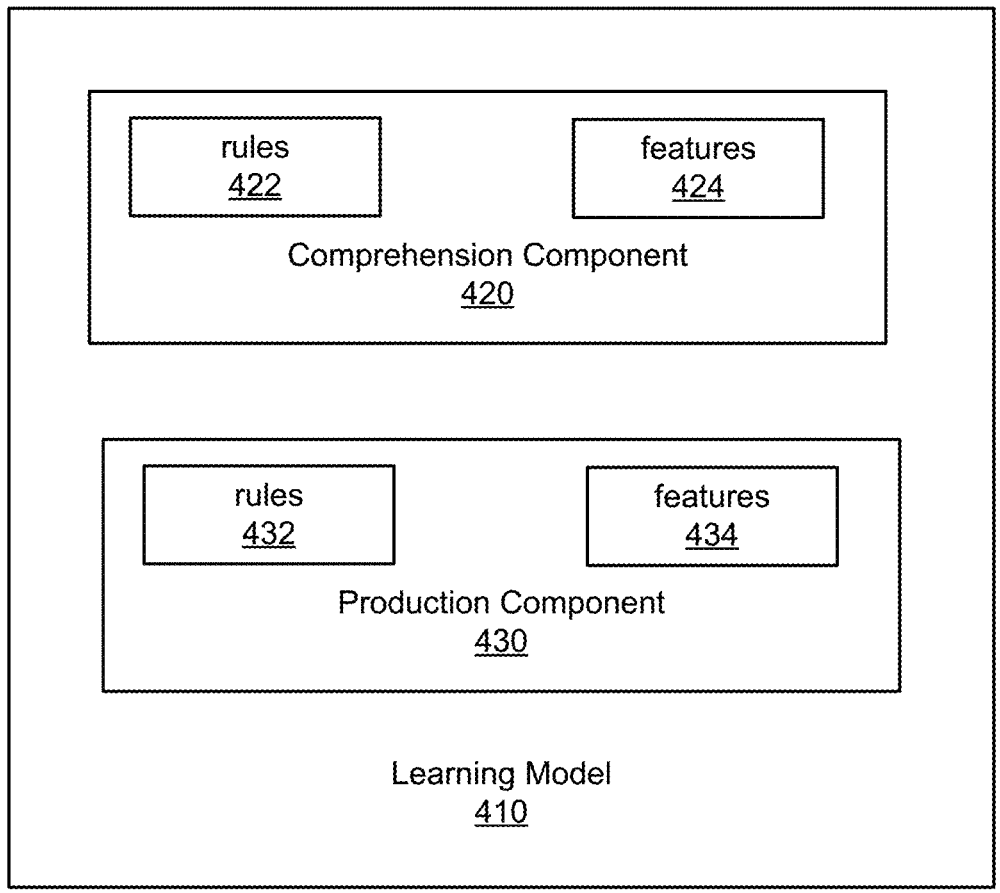
FIG. 4 is a block diagram of an exemplary learning model.

FIG. 4 is a block diagram of an exemplary learning model. The learning model 410 provides more detail for module 240 of FIG. 2. The learning model includes comprehension component 420 and production component 430.

The comprehension component converts context and a user utterance to a sequence of actions. The Production component converts context to a sequence of actions and an agent utterance. Each comprehension and production component can have rules and features—a structural part (set of rules) and a soft part (set of features). The purpose of the rules is to have relatively high recall. In some instances, the present technology can rely on a statistical model to rank the possible outputs. The comprehension rules can map sequences of tokens and categories to a sequence of actions. For example: "leaving before $Date($1)" results in [$1; FlightSearch[−1].parts.[0].latest_departure_time, Datetime [−1]). The production rules can map a pattern on the context to a sequence of actions and the natural language. For example: FlightSearch[−1].parts.[0].destination=null" produces "Where are you going?" Features, in some instances, can be simple and match various paths. Examples of feature include:

Phrase _ was mentioned in the last utterance

The value at path _ is _

Actions in turn _ wrote to path _

Figure 5:
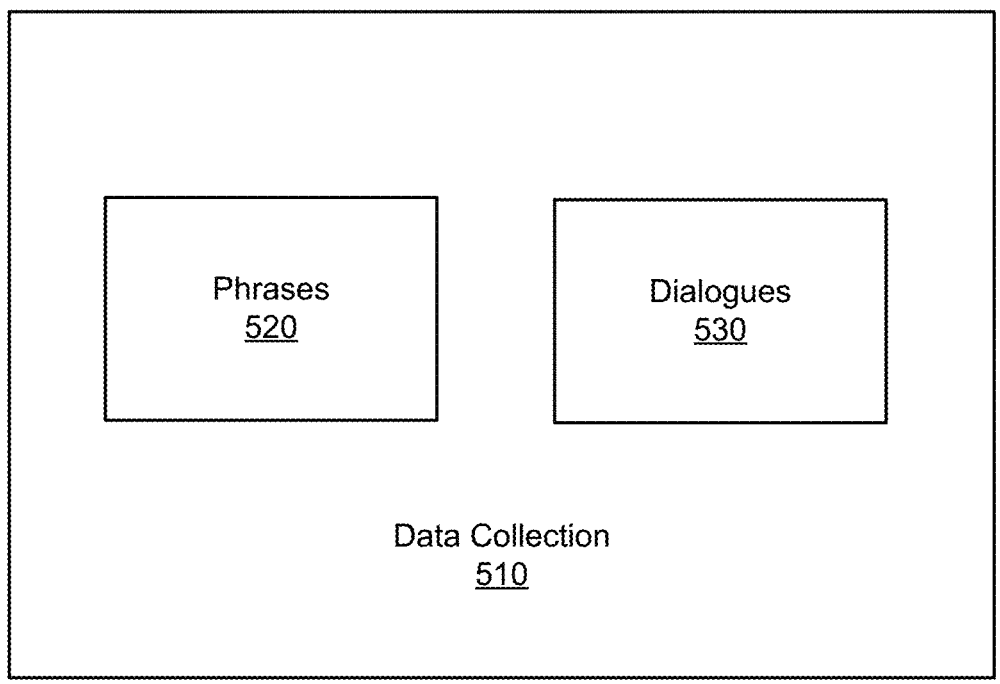
FIG. 5 is a block diagram of an exemplary data collection model.

FIG. 5 is a block diagram of an exemplary data collection model. Data collection 510 includes phrases 520 dialogues 530. The data collection module may implement a multi-tiered approach for data collection. In some instances, data collection module 510 may collect phrases and words of interest associated with a given domain, such as redeye, latest flight, no stops, layover, and other content associated with booking a flight. Data collection 510 may also construct dialogues from a subset of the phrases, where the dialogues use the phrases or something very similar to it the dialogues can be annotated with actions data collection module 510 may also provide paraphrase for annotated dialogues. The paraphrasing may be done given a bearing amount of context for the current dialogue.

Figure 6:
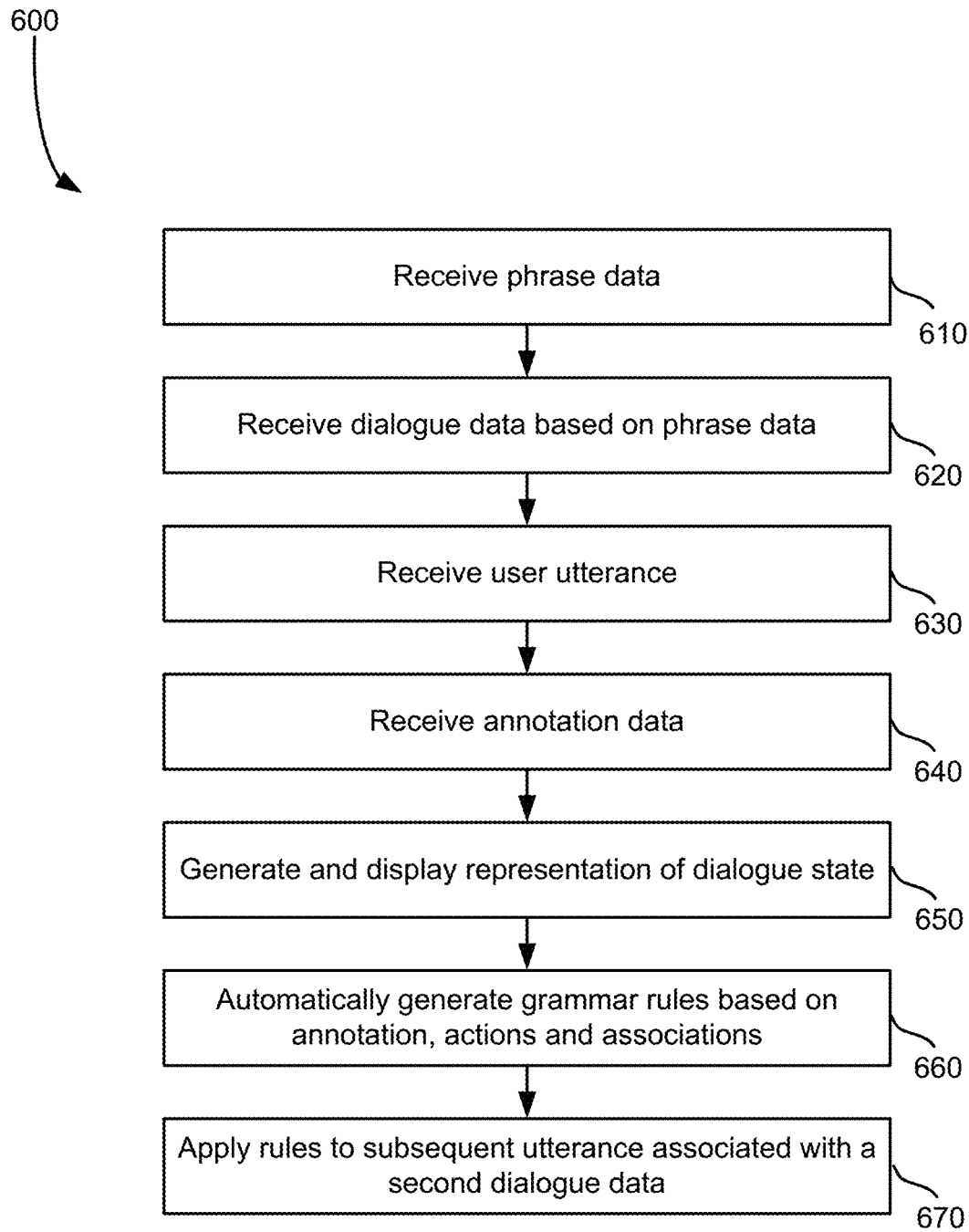
FIG. 6 is an exemplary method for expanding a dialogue system.

FIG. 6 is an exemplary method for expanding a dialogue system. Phrase data may be received at step 610. The phrase data may be received by a data collection module from a user and may be associated with a particular domain. Dialogue data based on the phrase data may be received at step 620. In some instances, the dialogue data is based on a subset of the phrase data.

An utterance may be received at step 630. The utterance may be received from either the agent (the present technology) or the administrator that is expanding the system and may be received through a user interface provided by an application executing on a computing device. When received from the administrator, the utterance may be received as text or audio data.

Annotation data may be received at step 640. The annotation data may be applied to the utterance, and/or may update the representation of the dialogue state. More details for receiving annotation data are discussed in more detail with respect to the method of FIG. 7.

A representation of the dialogue state may be generated and displayed at step 650. The dialogue state representation may indicate who is talking, and utterance, a sequence of actions, and other data concerning the dialogue. Examples of dialogue state representations are illustrated in FIGS. 10-27.

Grammar rules may be automatically generated based on the annotation, actions and associations at step 660. The grammar rules may be generated by a learning model having a grammar induction functionality. Given a dialogue, the present system will derive a set of grammar rules and a set of features for each row. The provided associations are used as a signal as to which features are relevant and how to carve out user utterances and generalize across carved boundaries.

Automatically generated grammar rules may be applied to subsequent utterances associated with a second dialogue data set at step 670. The rules generated as a result of steps 610-660 may be applied to other domains. Generation of the rules provides for expansion of the dialogue system by use of non-engineer and developer users.

Figure 7:
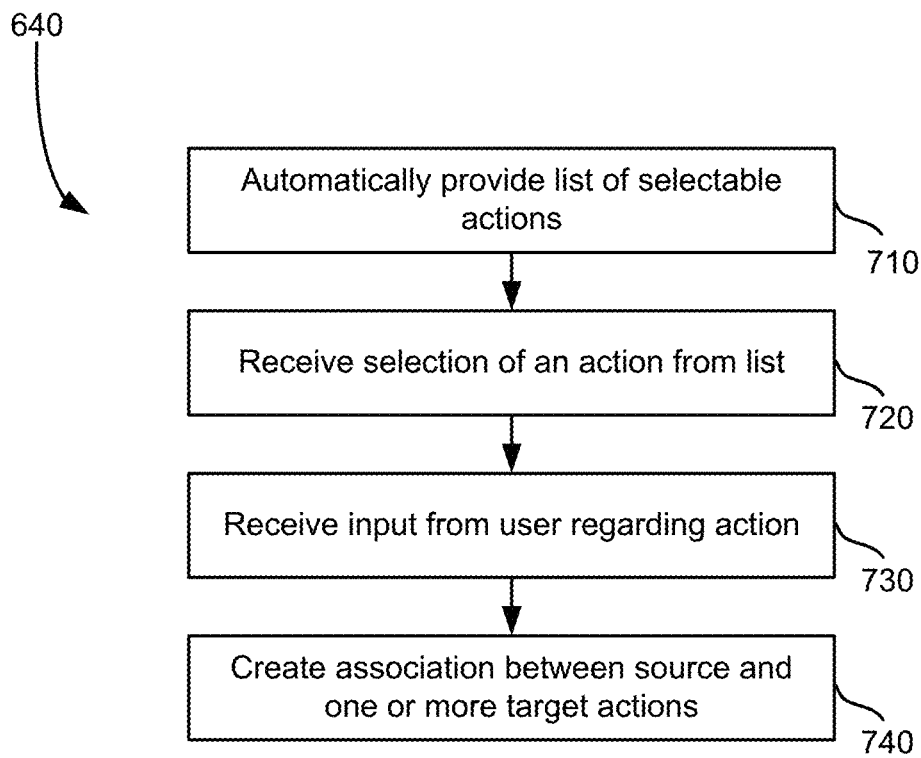
FIG. 7 is an exemplary method for receiving annotation data.

FIG. 7 is an exemplary method for receiving annotation data. The method of FIG. 7 provides more detail for step 640 of the method of FIG. 6. First, a list of selectable actions is automatically provided within an interface at step 710. The selectable actions are collected and displayed automatically based on the utterance or other user actions. A selection of an action from the list may be received at step 720. An action may be selected using a drop-down menu, placing a mouse over a particular action, or in some other input from the user regarding the selected action is received at step 730. For example, user may indicate a name of a city, provided value, parameter, or some other data regarding action.

An association between the source and or more target actions can be created at step 740. The Association allows system to learn why it took a particular action, for example what word in an utterance triggered a particular action.

In some instances, the created associations provide a link between an utterance and certain actions and generations. An association has a source part and a target part. Each part of an association is either a span of an utterance, a subsequence of actions, or a path in the state. For example, for a larger sentence 'I want to leave tomorrow', an administrator might create the following association to define 'tomorrow':

Tomorrow: now(_); get_date( ); 1:Number; to_days(_); forward([3:Datetime], [4:Datetime])

When provided with a dialogue, the present dialogue system derives a set of grammar rules and a set of features for each rule. The present system uses the provided associations as a signal as to what features are relevant and how to carve up user utterances and generalize across the carved boundaries. For example, if the present system has an association from 'tomorrow' to a sequence of actions, then we can abstract that from the larger rule for 'leaving tomorrow'.

Tokens can be identified as "[leaving [tomorrow]]", wherein bracketing denotes source associations. Actions can be identified, for example, as follows: now( ); to_datetime( ); 1; to_days( ); next(Datetime[−1], Duration[−1]); FlightSearch[−1].parts.[0].departure_dates+=_. This would induce the following rules:

leaving $Date=>$Root[$1; FlightSearch[−1].parts.[0].departure_dates+=_]

tomorrow=>$Date[now( ); to_datetime( ); 1; to_number( ); to_days( ); next(Datetime[−1],Duration[−1])]

The dialogue system of the present technology can be implemented by one or more applications, implemented on a mobile device of the user, on remote servers, and/or distributed in more than one location, that interact with a user through a conversation, for example by texting or voice. The application(s) may receive and interpret user speech or text, for example through a mobile device microphone or touch display. The application can include logic that then analyzes the interpreted speech or text and perform tasks such as retrieve information related to the input received from the user. For example, if the user indicated to the executing application that the user wanted to purchase a TV, the application logic may ask the user if she wants the same TV as purchased before, ask for price information, and gather additional information from a user. The application logic can make suggestions based on the user speech and other data obtained by the logic (e.g., price data). In each step of the conversation, the application may synthesize speech to share what information the application has, what information the user may want (suggestions), and other conversations. The application may implement a virtual intelligent assistant that allows users to conduct natural language conversations to request information, control of a device, or perform tasks. By allowing for conversational artificial intelligence to interact with the application, the application represents a powerful new paradigm, enabling computers to communicate, collaborate, understand our goals, and accomplish tasks.

Figure 8:
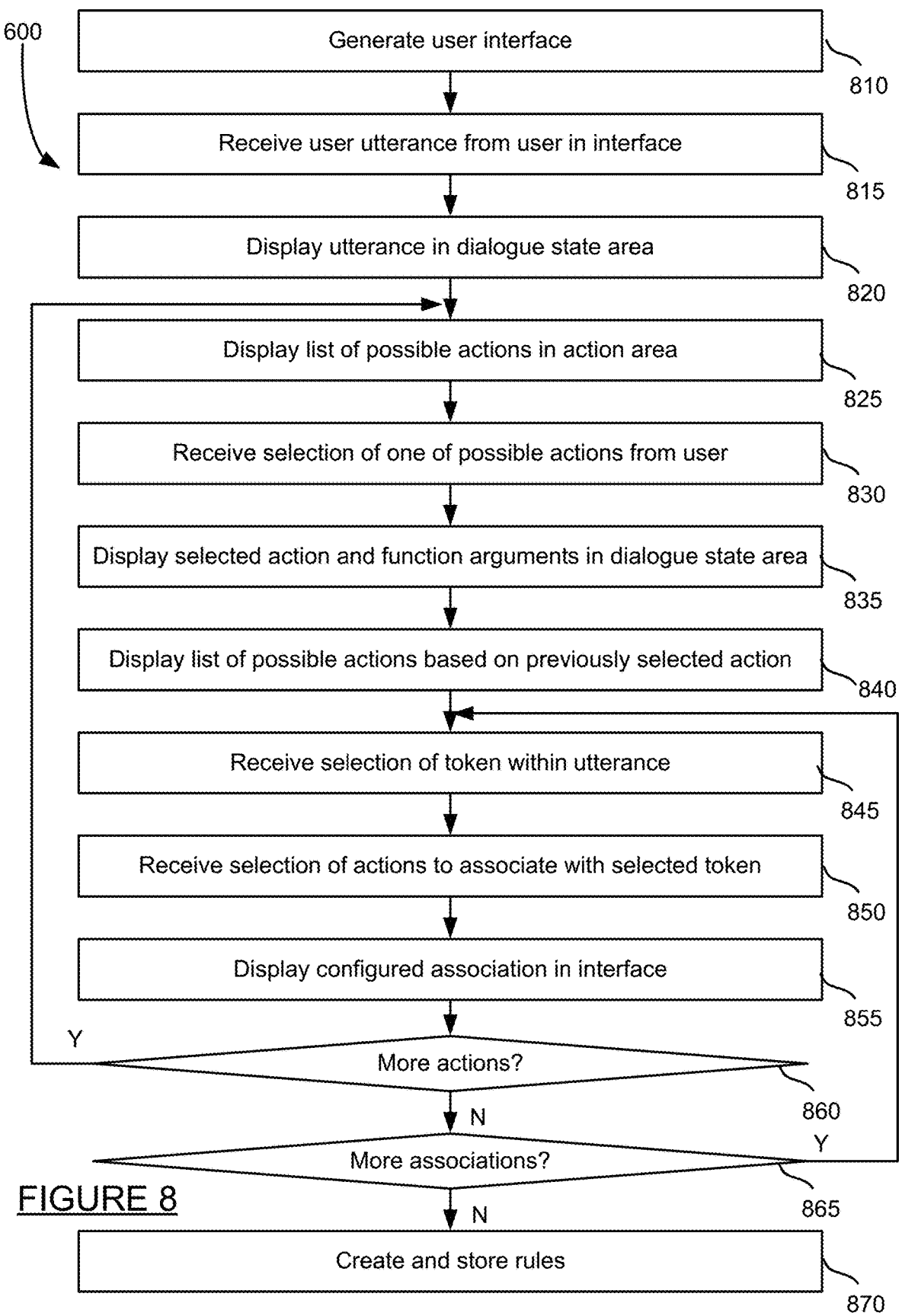
FIG. 8 is an exemplary method for receiving annotation data through a user interface.

FIG. 8 is an exemplary method for receiving annotation data through a user interface. The user interface may be provided by interface module 220 of dialogue expansion 200. First, the user interface is generated and instantiated at step 810. User interface may include a dialogue state area, input type indicator, input area, an action area. The dialogue state area may display updates made to the dialogue state, for example actions taken or selected, data received from user, and other updates. The input type indicator indicates what an input is, such as a verbatim value or a string. The input area is a dedicated portion of the interface that allows a user to provide input. The action area indicates actions undertaken while processing a user utterance.

Interface may receive an utterance from a user at step 815. The utterance may then be displayed in a dialogue state area at step 820. A list of possible actions is then displayed in the action area at step 825. A selection of one of the possible actions is received and highlighted at step 830. The selected action and any function arguments may then be displayed in the dialogue state area at step 835. A list of possible actions based on a previously selected action may then be displayed at step 840. A selection of a token within an utterance then selected at step 845. A selection of actions to associate with the selected token is received at step 850.

An association configured in the interface is displayed at step 855. The association may tie the selected token to the selected one or more actions. A determination is made as to whether more actions should be taken at step 860. If more actions should be taken, the method returns to step 825 or a list of possible actions is displayed in an action area. If more actions are not taken, a determination is made as to whether more associations at step 865. If more associations should be made, the method returns to step 845 where selections of tokens and actions are received. If no more associations need to be created, rules are created and stored at step 870 the rules are generated based on the dialogue state, action selected, and associations.

Figure 9:
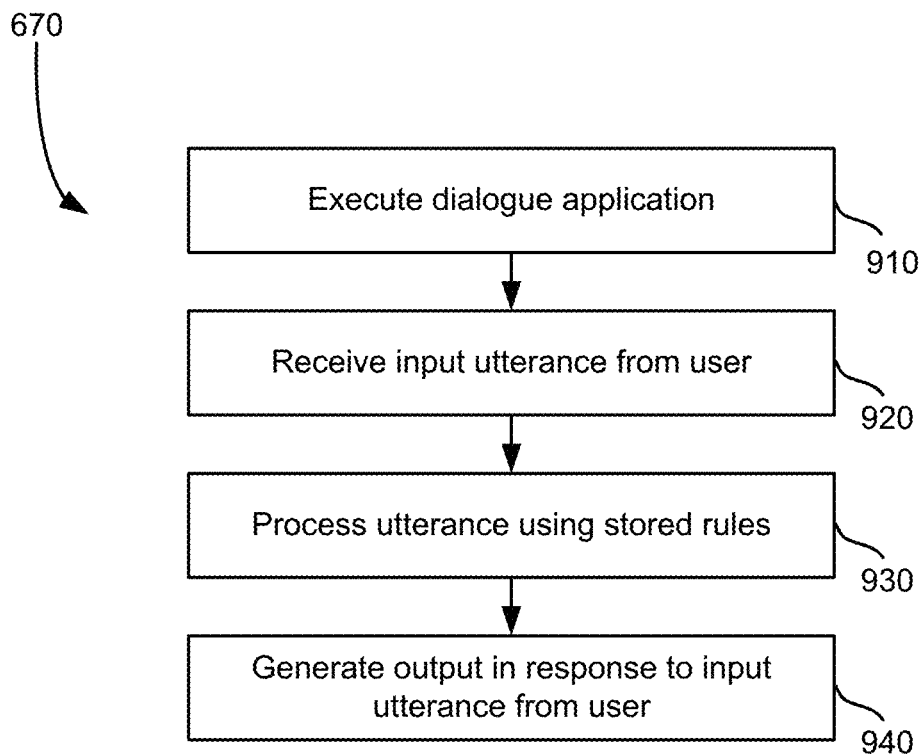
FIG. 9 is an exemplary method for applying rules to an utterance.

FIG. 9 is an exemplary method for applying rules to an utterance. A dialogue application is executed at step 910. The dialogue application may be application 112, mobile application 122, network browser 132, or application 162 the system of FIG. 1. An input utterance is received from user at step 920. The utterance is then processed using stored rules at step 930. The rules may indicate what actions to take and values to set, and the rules may be applied to an entirely new data domain. An output is generated in response to the input utterance from the user at step 940. The output is a result of processing the utterance using the stored rules.

FIGS. 10-27 illustrate exemplary user interfaces for use with an expandable dialogue system. In some instances, the user interfaces of FIGS. 10-27 illustrate an exemplary work flow for expanding the capability of a dialogue system.

Figure 10:
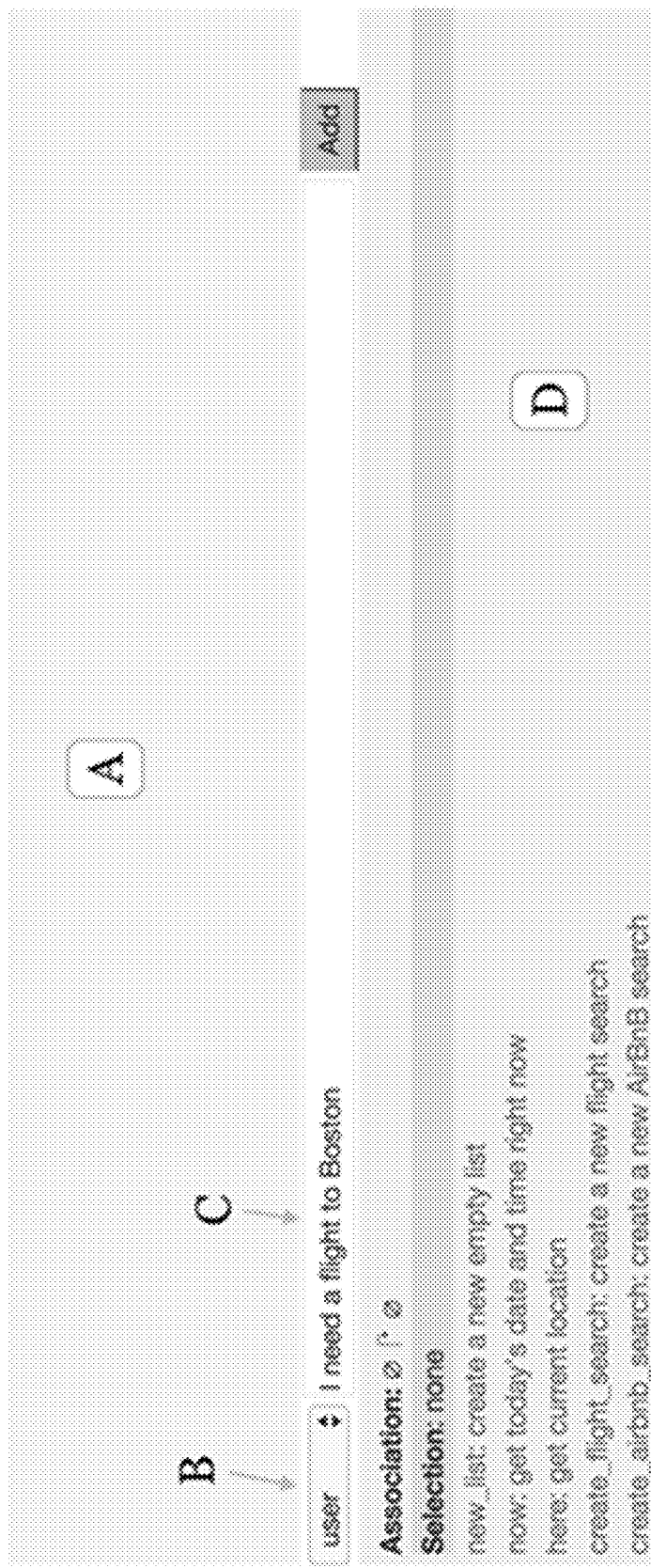
FIGS. 10-27 illustrate exemplary user interfaces for an expandable dialogue system.
Figure 11:
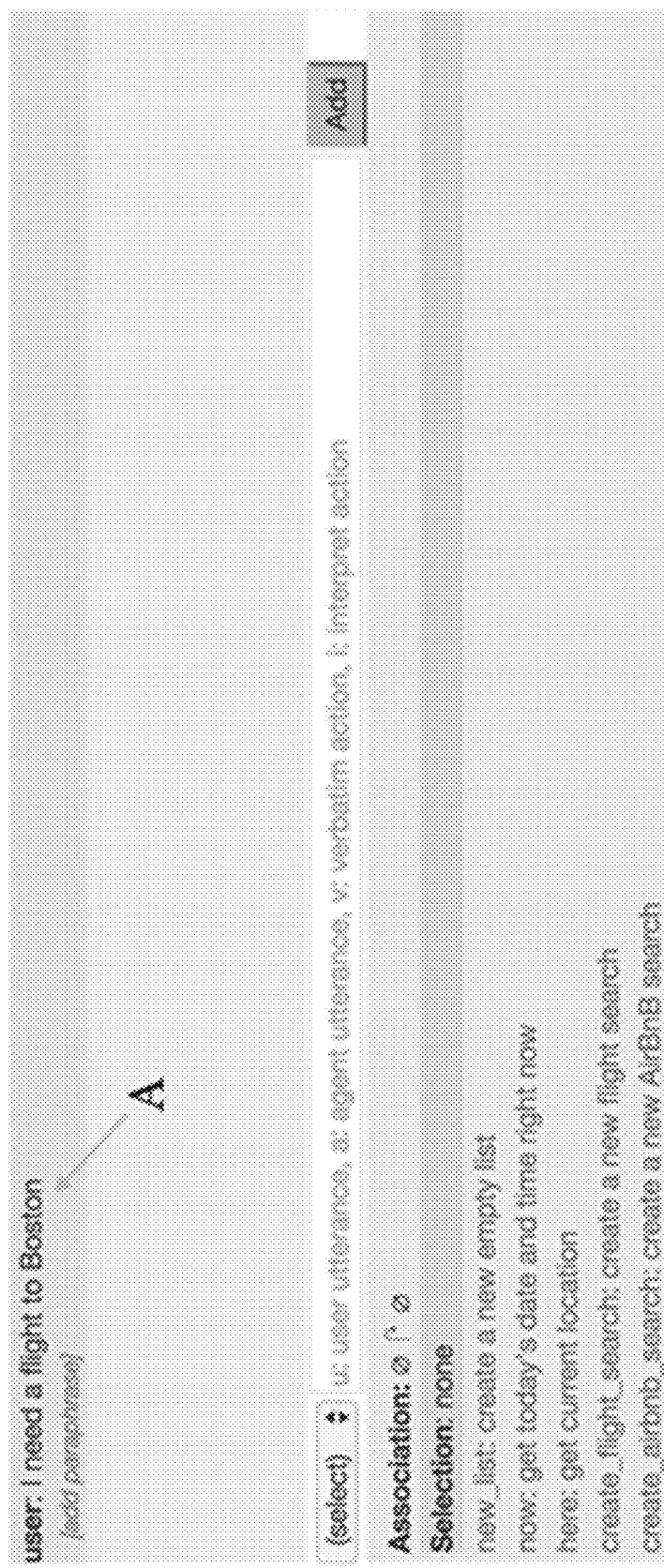
Figure 12:
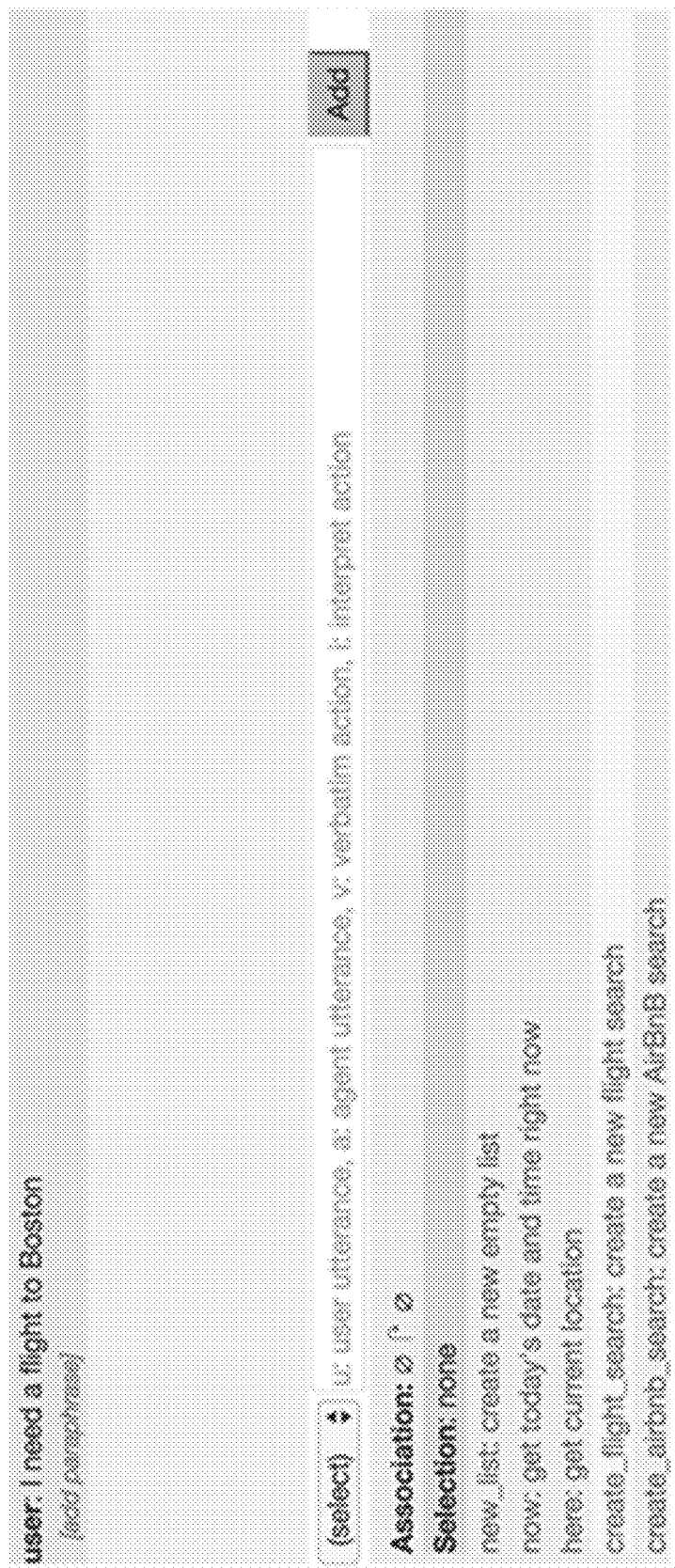

FIG. 10 illustrates an initial view of a dialog expansion user interface. Section A is a dialogue history area in which utterances and dialogue appear. Section B includes an input type area that indicates the type of item. Section C includes the user utterance to receive. Section D shows all the actions which can be performed using the current selection as inputs. There is currently no selection, so these actions can all be performed with no inputs.

Once a new utterance is added to a dialogue (FIG. 11, in section A), the state can be updated. The state can be updated (as in FIG. 12) with the actions which should be taken given the user utterance. From the user utterance "I need a flight to Boston,", a new flight search is added to the state. An administrator can find the action create_flight_search and click it to add the result of the action, an empty flight search, to the state.

Figure 13:
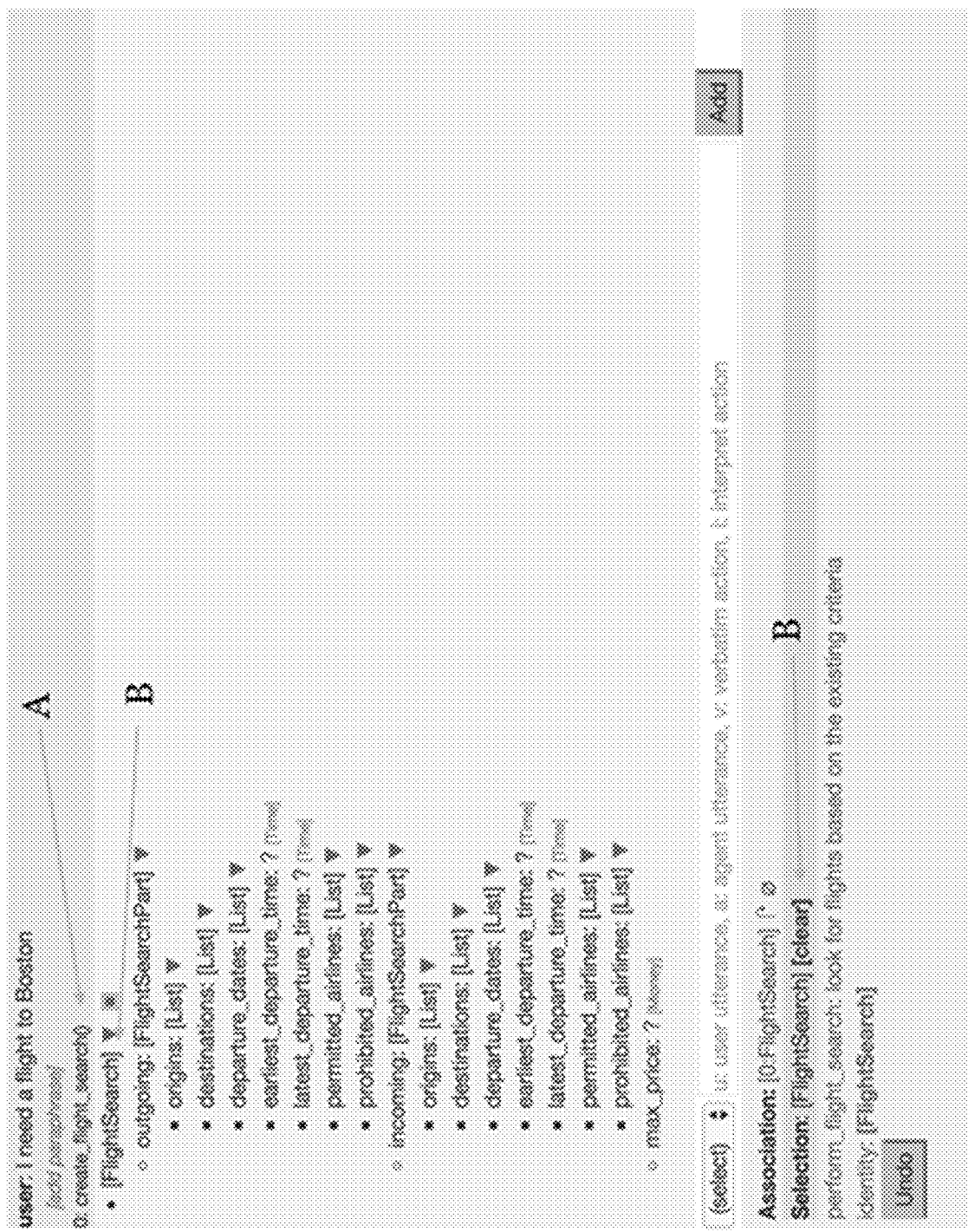

In FIG. 13, the action create_flight_search has added a new FlightSearch to the dialogue state. The FlightSearch is automatically selected when it is added. Notice that the action area now has actions which can be performed with the selection of FlightSearch Next, associations can be created which indicate to the system why we called the action create_flight_search. While associations are not strictly necessary for all interactions, they provide the system with helpful hints for learning.

The association added in FIG. 13 is create_flight_search because the word flight appeared in the user utterance. To add the association, an administrator selects the start and end of the span in the user utterance by clicking the text. In this case click the first and last letter of flight. Next, the administrator selects the action from the state to associate with this span. In this case click create_flight_search( ) The association has now been updated to reflect that flight triggered the create_flight_search( ) The administrator can then click [add] to create the association.

The association has now been added between flight and create_flight_search( ).

Figure 14:
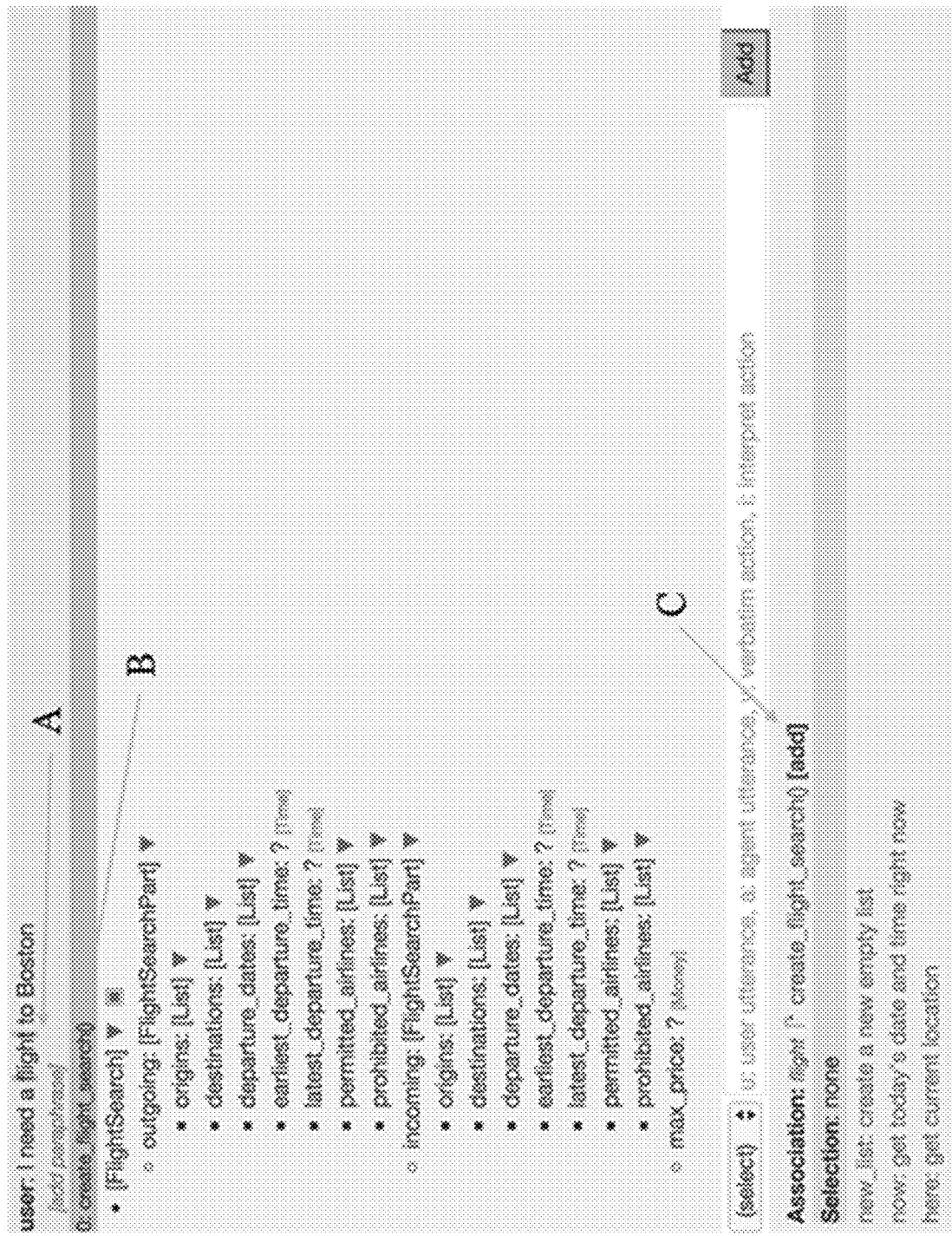

In the user interface of FIG. 14, an administrator can update the state with to Boston. To do this, the administrator takes the String Boston, lookup that location, get all the airports for that location and finally put the airport code into the outgoing destinations list of the FlightSearch. The verbatim input type can be interpreted as the value being input is a String value, often it is a String from the user utterance. Input the String value Boston which we will use to lookup the city.

Figure 15:
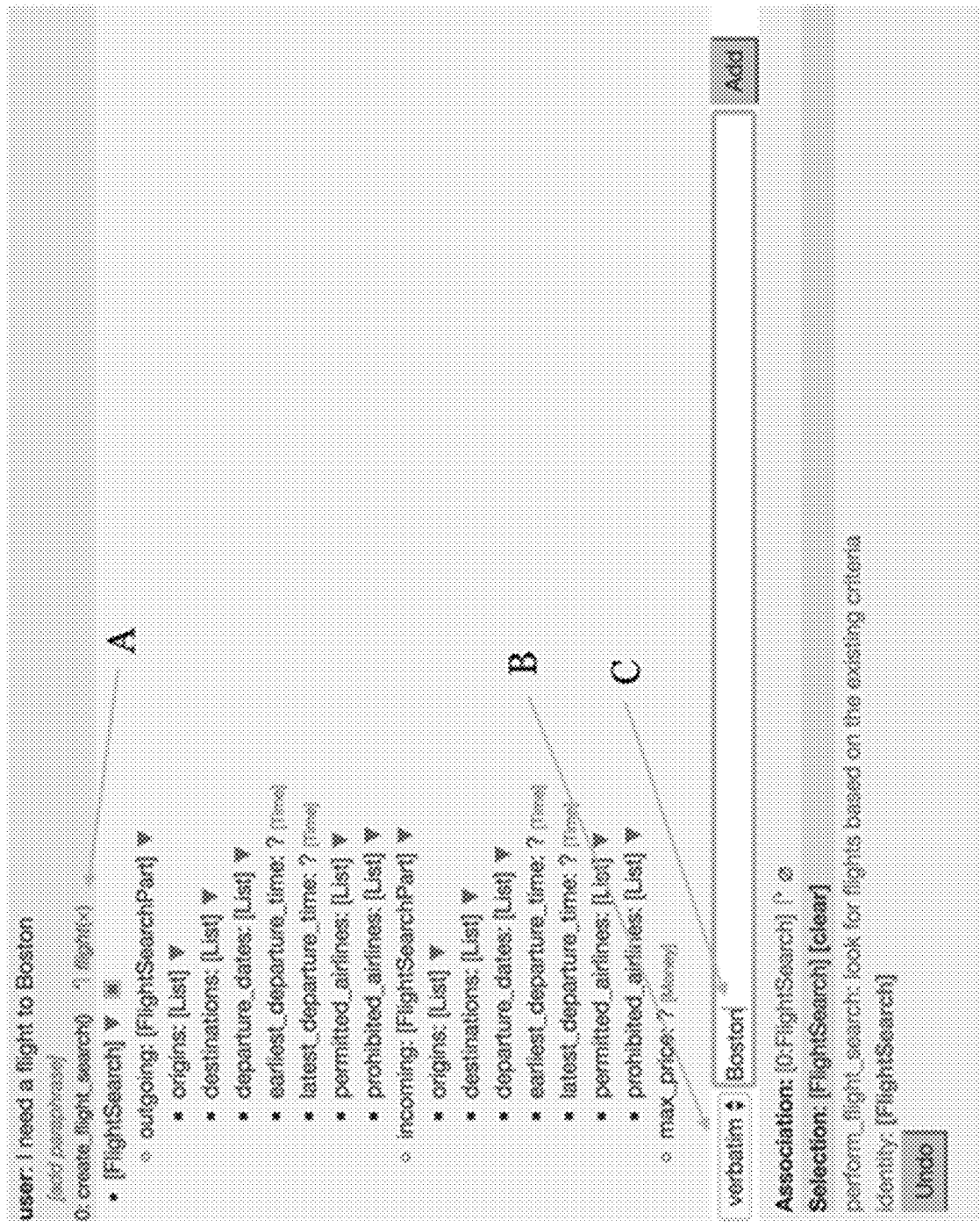

In FIG. 15, the String Boston has been added to the state. The selection is automatically set to the new state value of Boston. The administrator may want to call the action to_entities, which will look for known entities matching Boston. Entities are a predefined list of known things such as locations and airport codes.

Figure 16:
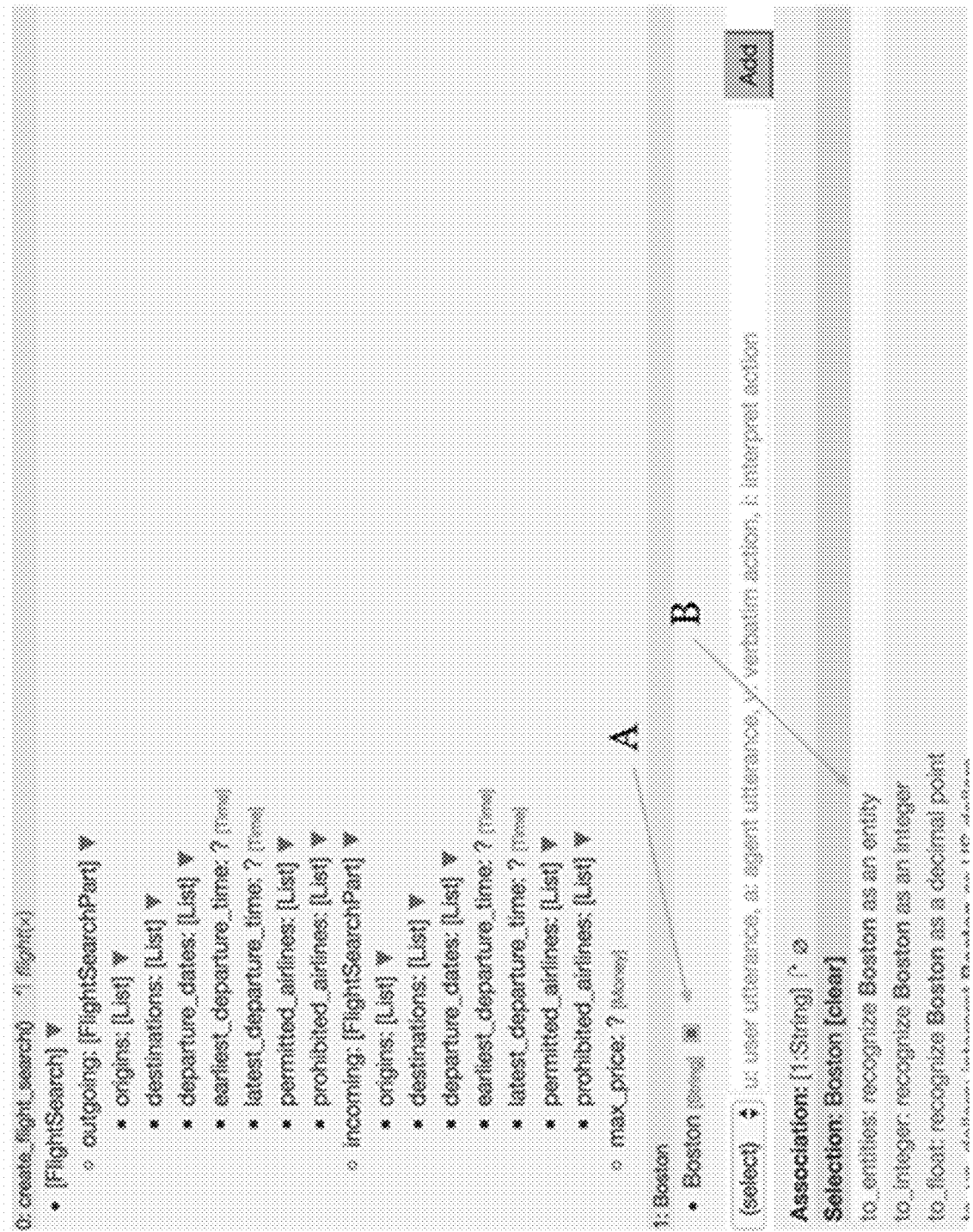

In FIG. 16, section A, the call to to_entities([1:String]) took the String Boston and looked up all entities matching it. The result is a list with the city Boston which was added to the state. The present technology can then, in section B, extract the city from the results for the convenience of referencing it.

In some instances, with regard to action representation, each action and its inputs in the state uses the notation N: action_name(input_1, . . . , input_M), where N is the index in the state the result is being place into. Action_name is the name of the action being called. If it isn't present, then it was a verbatim value or identity action, and for Input_1, . . . , input_M, each input is a path to the state value. For example, "Boston" places the verbatim value Boston at index 1 in the state, "to_entities ([1:String])" calls to entities on the String at index 1 in the state and assigns the results to index 2 in the state, and get_airport_code([4: List].[0]) calls get_airport_code on index 0 of the list found at index 4 of the state and assigns the results to index 5 in the state.

Figure 17:
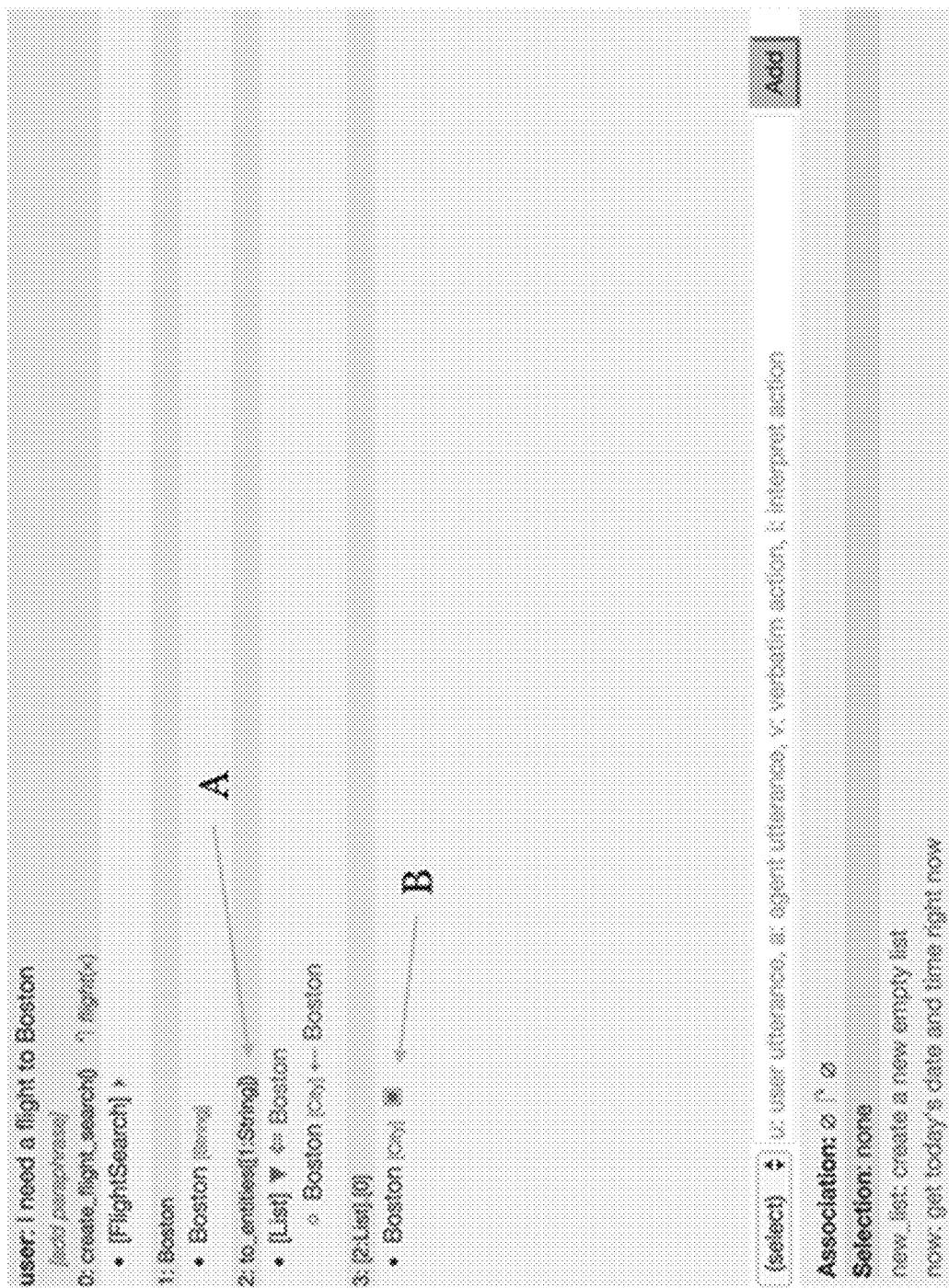

In FIG. 17, an association from the span Boston is added in the user utterance to the actions just performed. This is done as before by clicking the start and end of the span Boston and then selecting multiple actions using Alt+Click. Notice that the association is from Boston to the sequence of actions. The user may select [add] to create the association.

Figure 18:
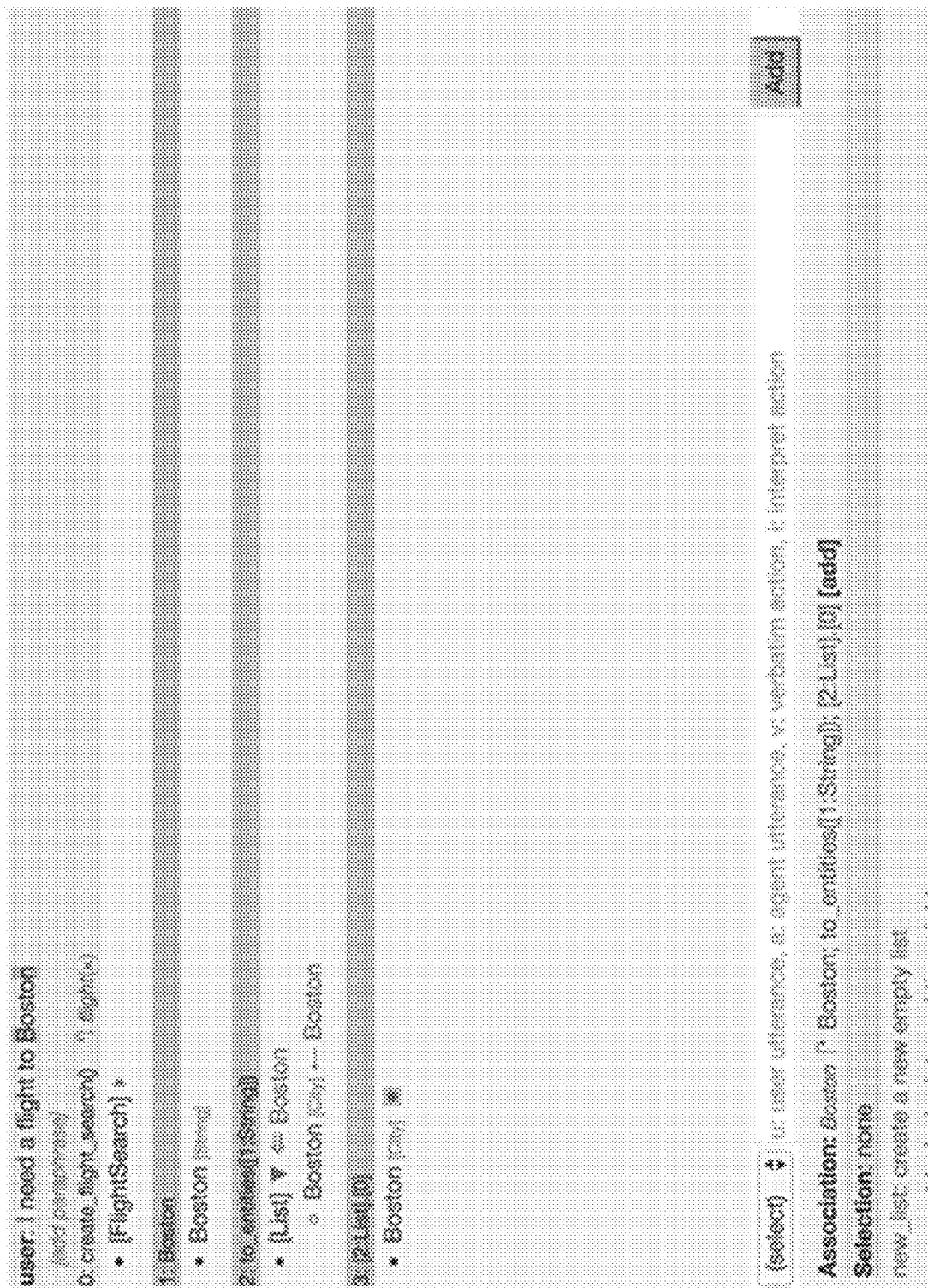

In FIG. 18, the airport code for airports in Boston can be resolved. The present technology does this by clicking Boston [City] in the state and calling get_airports. This adds to the state get_airports([3:City]). Next click General Edward Lawrence Logan Intl [Airport] and call get_airport_code on the first element of the result which adds to the state get_airport_code ([4:List].[0]) with a result of BOS [AirportCode].

Figure 19:
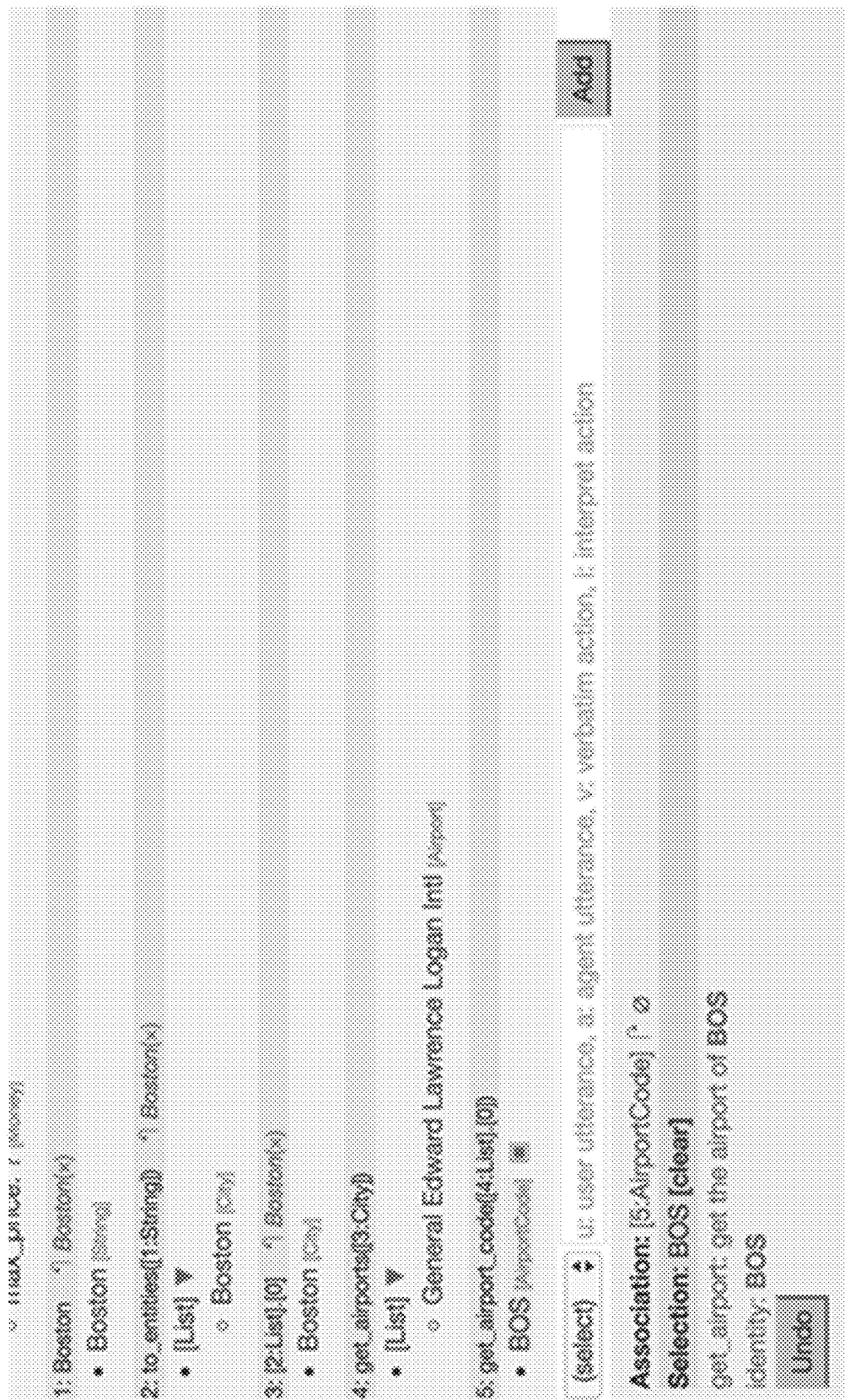

In FIG. 19, the administrator keeps BOS [AirportCode] selected in section A, as indicated by the selection. The administrator may click the "⇐" by the outgoing destinations of the FlightSearch. This will append BOS to the list of destinations.

Figure 20:
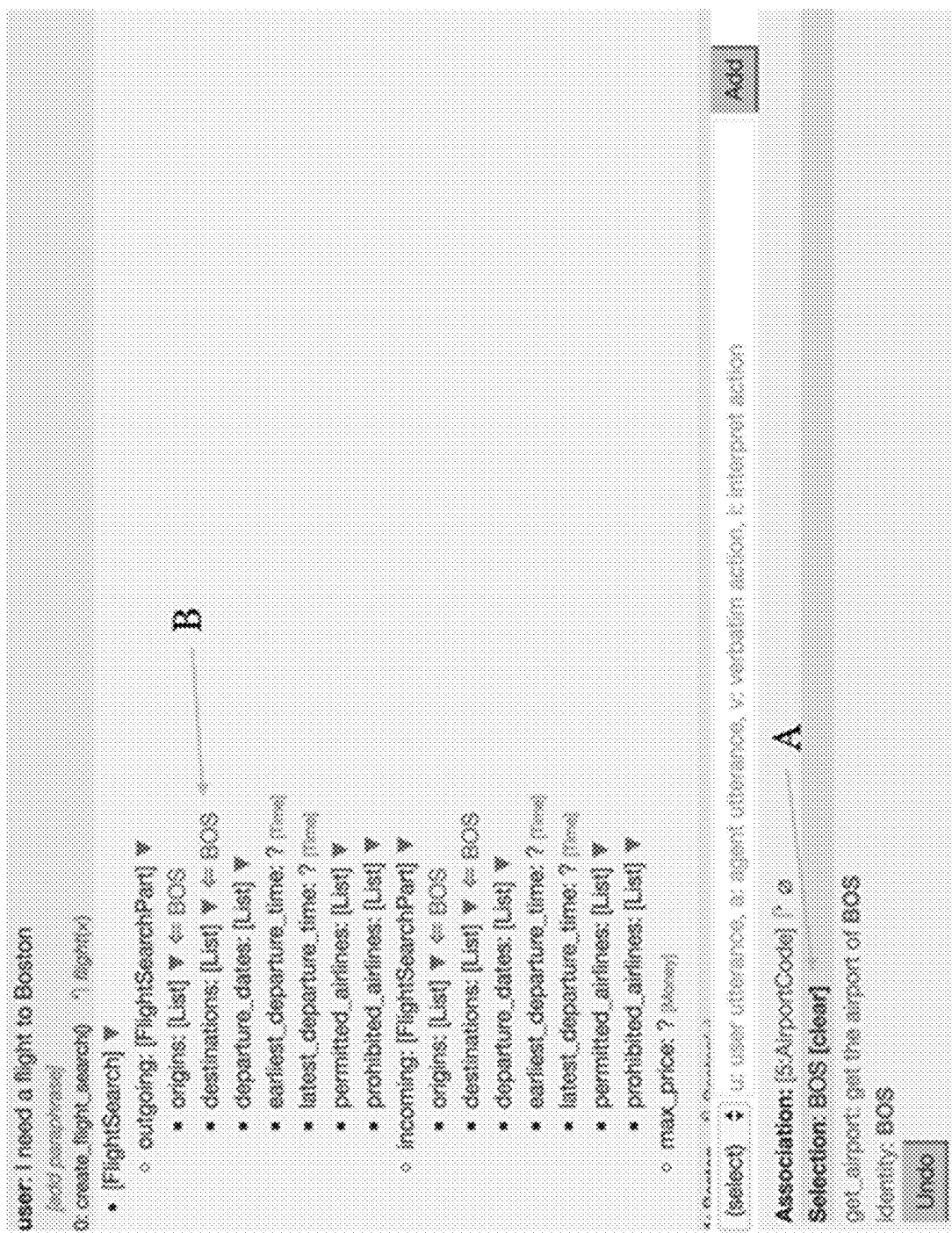

Rather than mutating the existing FlightSearch, a new FlightSearch with BOS in the destinations list has been added to the state in FIG. 20. The user interface illustrates the action for this entry is appending the AirportCode at state index 5 to the outgoing destinations list of the FlightSearch at index 0 of the state.

Figure 21:
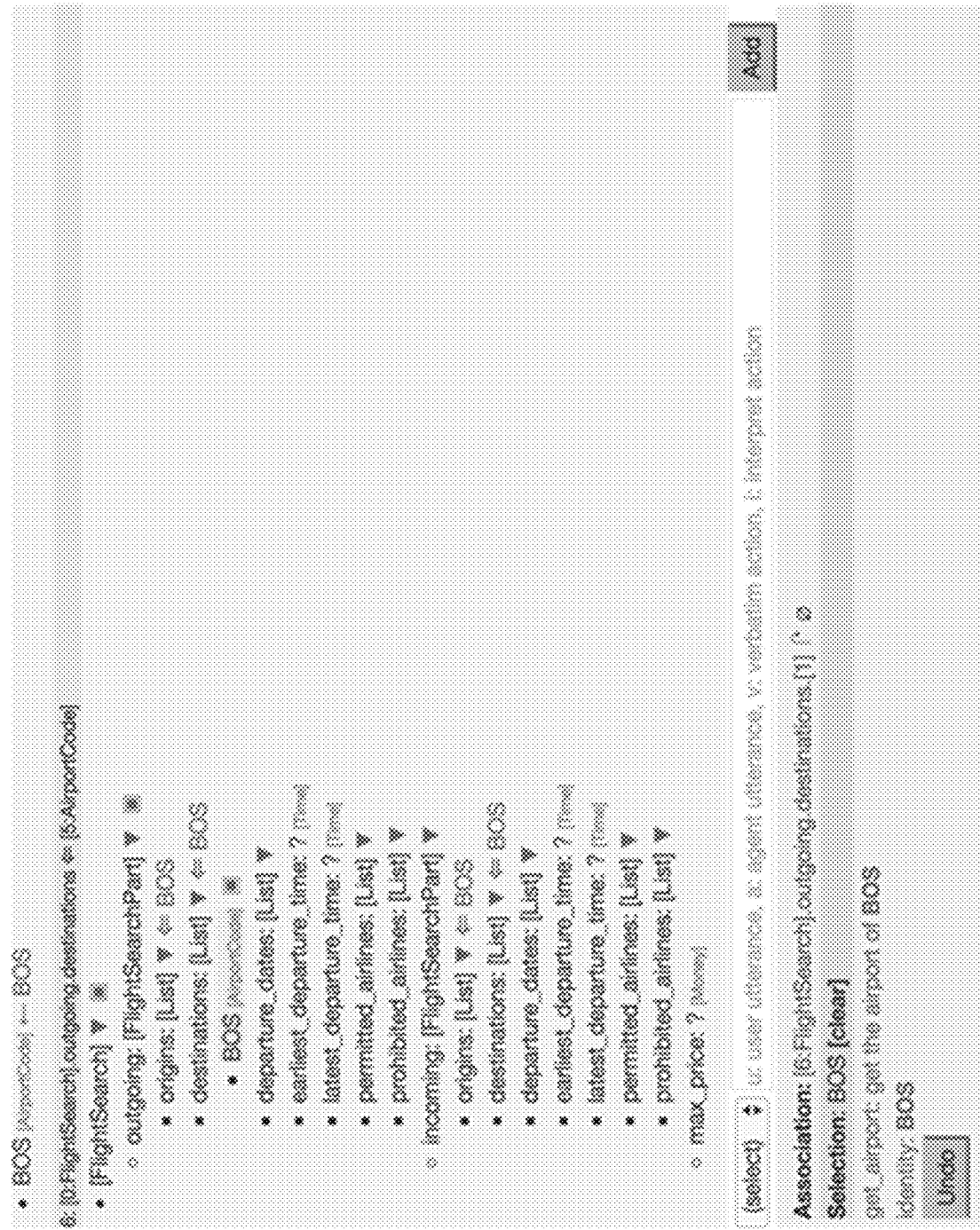

In FIG. 21, associations are to be added which indicate the reason BOS is added to the destination is that the user utterance contained to Boston. As before, the process starts by selecting the span to Boston in the user utterance. Actions are then selected which take the City of Boston, convert it to an AirportCode, and finally place it into the destinations list. One can see the association this will add is that to Boston was the reason that the three actions were performed. An administrator may then select [add] to create this association.

Figure 22:
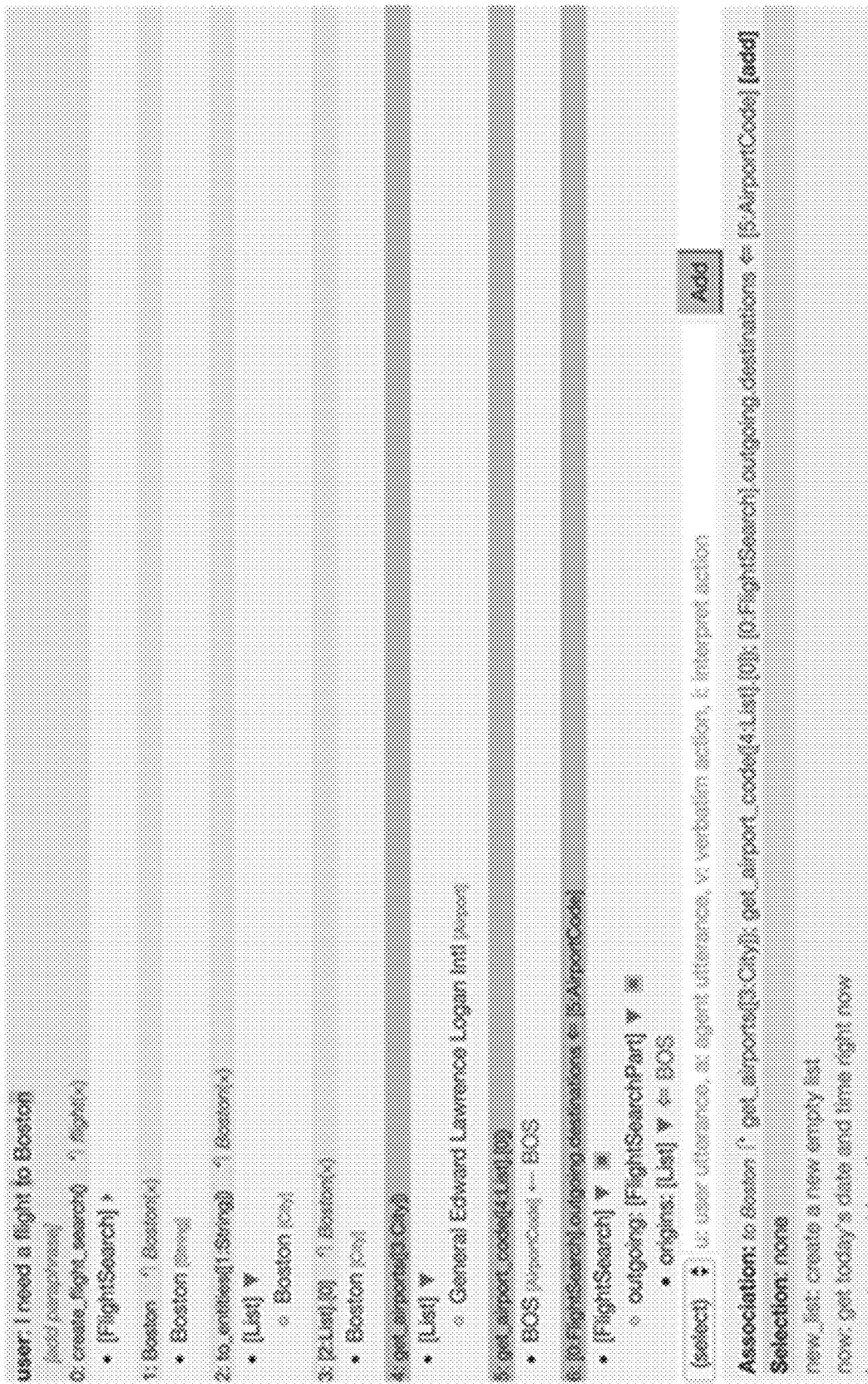
Figure 23:
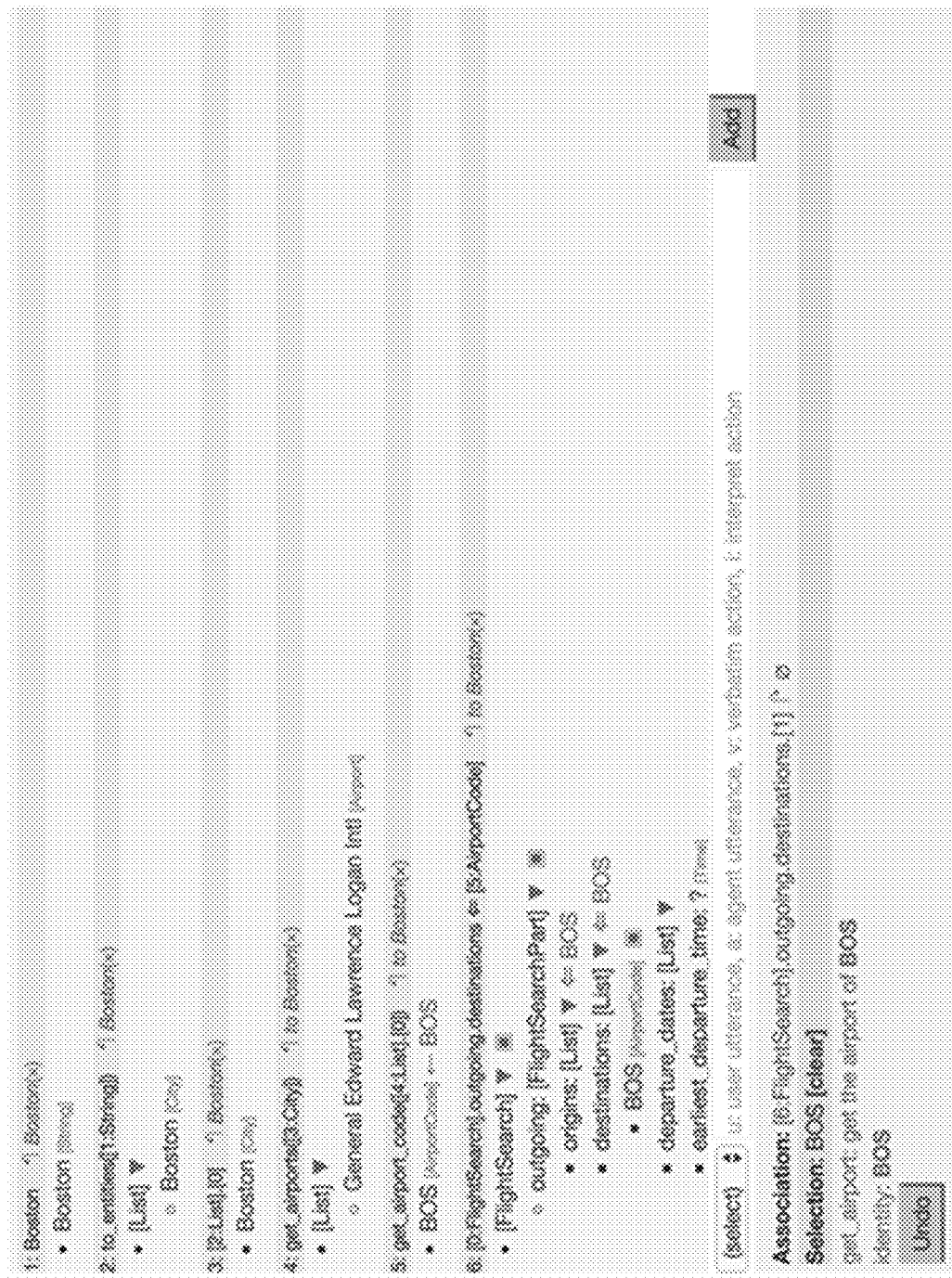

In FIG. 22, the association has now been added. The actions to create the City of Boston and the action which create the AirportCode and assign it to the FlightSearch have overlapping but different spans. This is because Boston alone is simply a city and doesn't necessarily have anything to do with airports or flights. However, to Boston, in the context of this system, indicates that Boston is a destination the administrator/user wants to get to. Since we get to places via flights, and flights have AirportCodes the span to Boston tells us we need to convert the city and assign it into a FlightSearch. You could imagine a system which also handles other forms of transportation not being able to make the assumption that to Boston should become an AirportCode unless the context indicates that our mode of travel is air travel.

Figure 24:
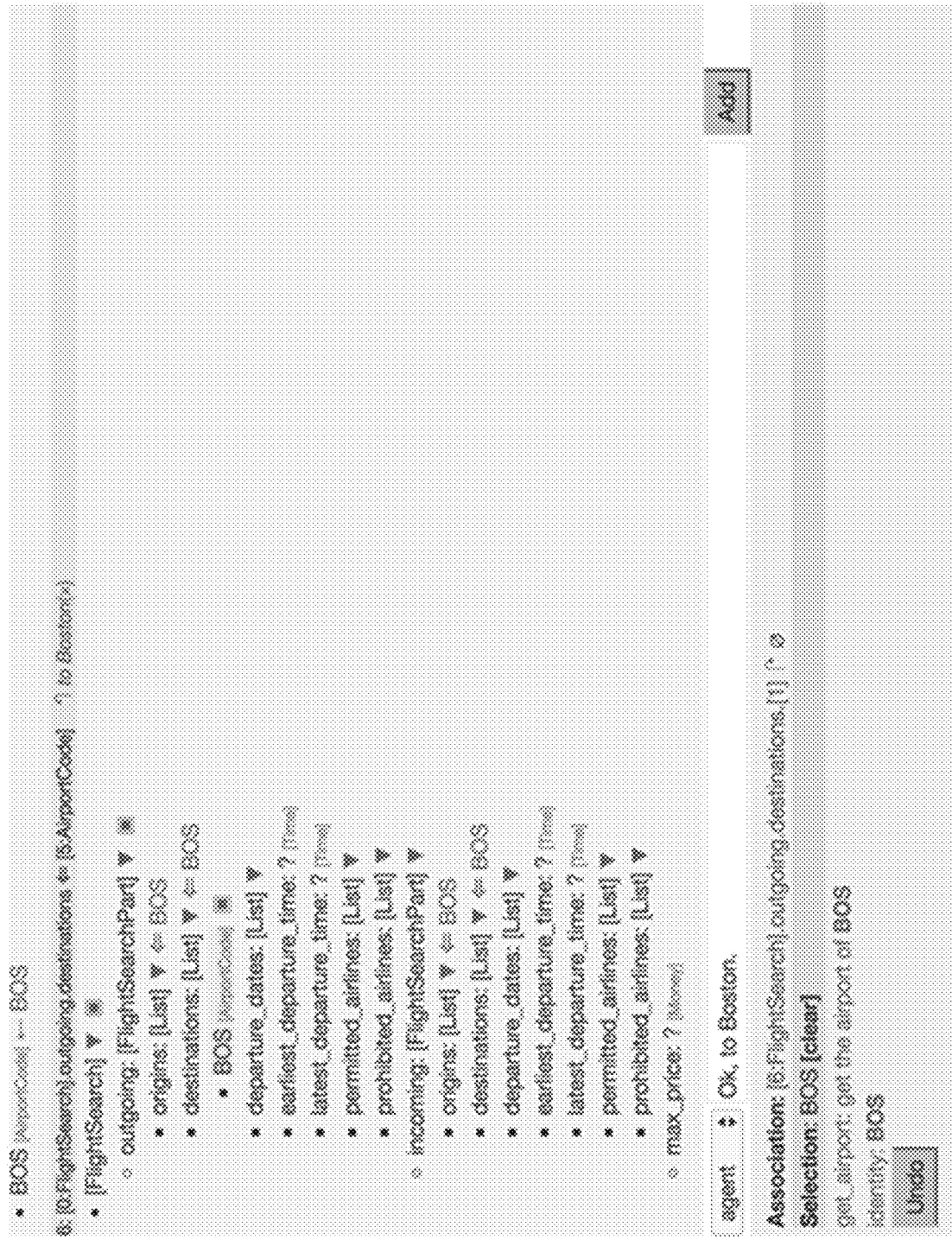

Next, in FIG. 24, an agent utterance "Ok, to Boston" is added. The dialogue system created the utterance for the agent to say because the destinations of the FlightSearch was filled. The present system can, in FIG. 23, add an association to reflect this. The administrator selects the entire span of the agent utterance to indicate that the association is the reason the entire utterance was said rather than just a part of it. The administrator can also select the part of the state which causes us to say this utterance. Notice how the association that will be created is the reverse of the associations we were building for user utterances. That is to say, the agent said the utterance Ok, to Boston. because the change in outgoing destinations of the FlightSearch at index 6 of the state. This association will allow the system to learn to inform the user when the destination of a flight search is changed. The administrator can select [add] to add this association.

Figure 25:
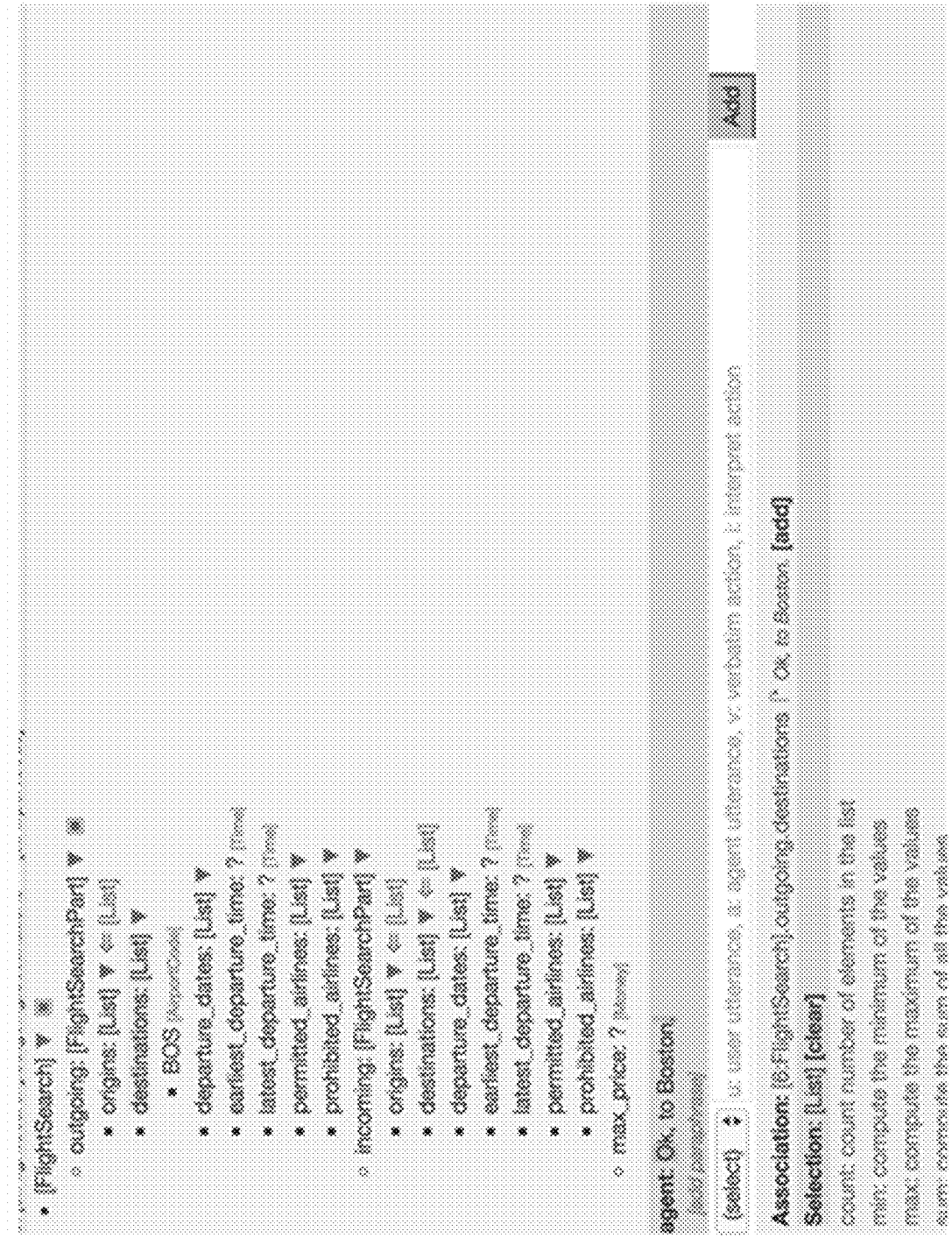

In FIG. 25, the association wraps the agent utterance. This indicates that the agent utterance inside the { . . . } depends upon the state value outside the { . . . }.

An administrator may also want to add an association for why the agent utterance uses Boston rather than BOS. While the City we created earlier in the state from the user utterance could be used, the more general approach is to calculate what to say based on only the FlightSearch this utterance depends upon. This is an important property of agent utterances. They should always be generated from their dependencies. That is to say for any agent utterance A which depends upon state values V, any text verbatim values (such as Boston) in A must be computed from V. This is an important property to guarantee that the system learns both when to say things, and how to generate what to say.

To ensure this property holds, the administrator can select the AirportCode in the outgoing destinations of the FlightSearch and call get_airports on it. Next, the present system takes that result and turn it into a City using get_city. Finally, the administrator selects the span Boston in the agent utterance and the state value we just computed of Boston. The administrator can select [add] to add this association.

Figure 26:
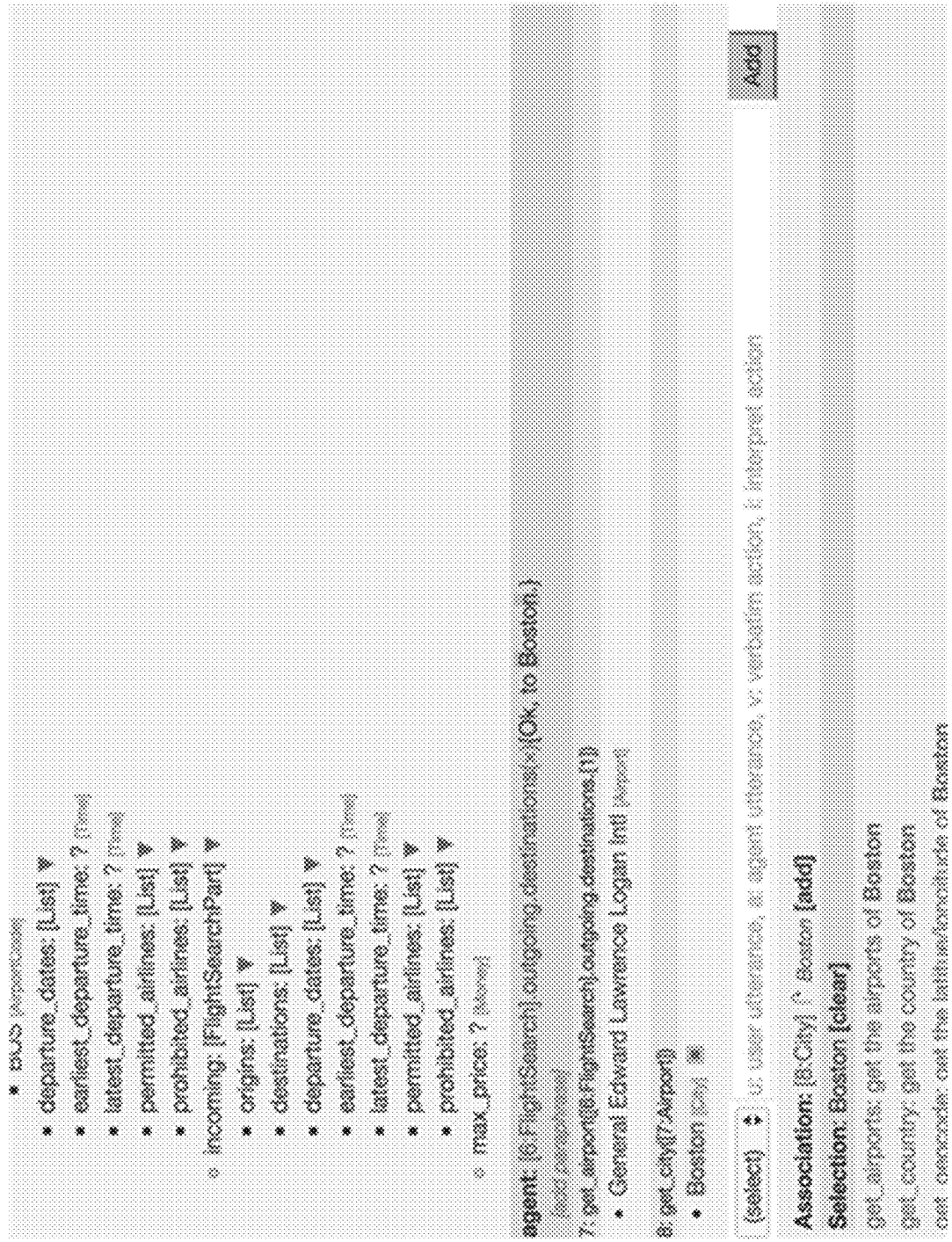
Figure 27:

In FIG. 26, the new association is added to the agent utterance. It can be seen that Boston in the agent utterance now depends upon the City we computed. This will allow the system to learn that if it needs to say this utterance, it will need to call the proper actions to generate a City from the outgoing destinations of the FlightSearch.

Figure 28:
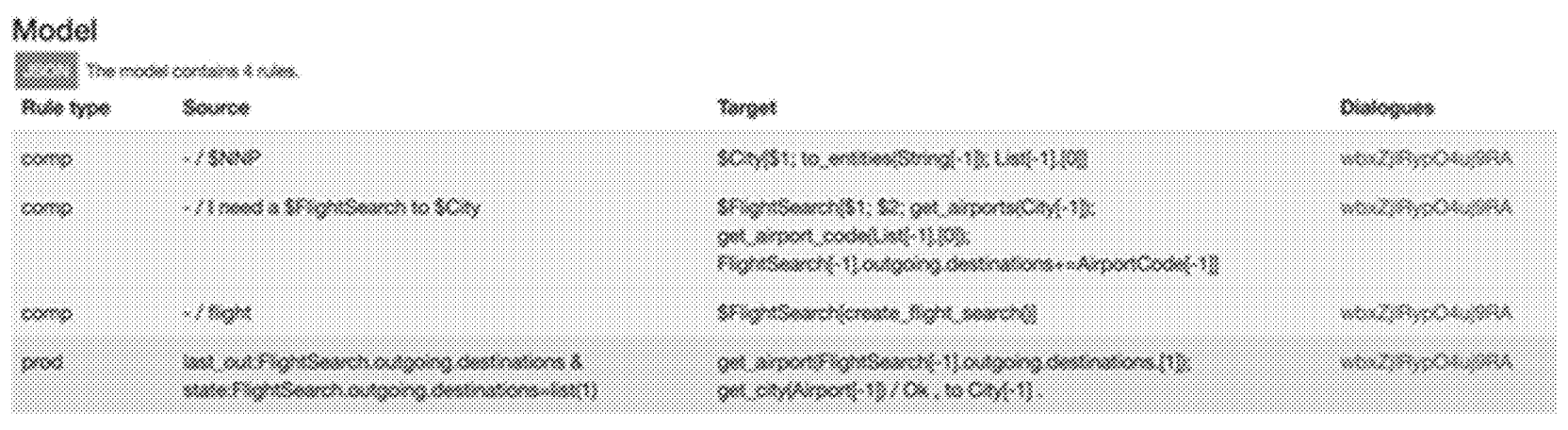

FIG. 28 illustrates a set of rules generated by the user interfaces of FIGS. 20-27. The first three rules are composition rules for interpreting user utterance. The last rule is a production rule for generating agent utterances.

The first rule recites that for any singular proper noun in a user utterance, the present technology can call to_entities on it and then use the first result if it is a City.

The second rule recites that for any user utterance of that form, the present technology should calculate the AirportCode from the City and append it to the outgoing destinations list of the FlightSearch. The $FlightSearch and $City tokens in the source defer to other rules to produce those elements. For example, if the present technology had a rule where ticket created a FlightSearch then the utterances I need a ticket to Boston and I need a flight to Boston would create identical states.

The third rule recites that the word flight will call create_flight_search which produces a FlightSearch.

The fourth rule, the production rule, means that if the last path output to was the outgoing destinations of a FlightSearch and that list has length one, then the present technology should get the airport from that destination, the city from that airport and finally say the agent utterance Ok, to City[−1], where City[−1] is the last City in the state, which will always be the City we just computed.

Figure 29:
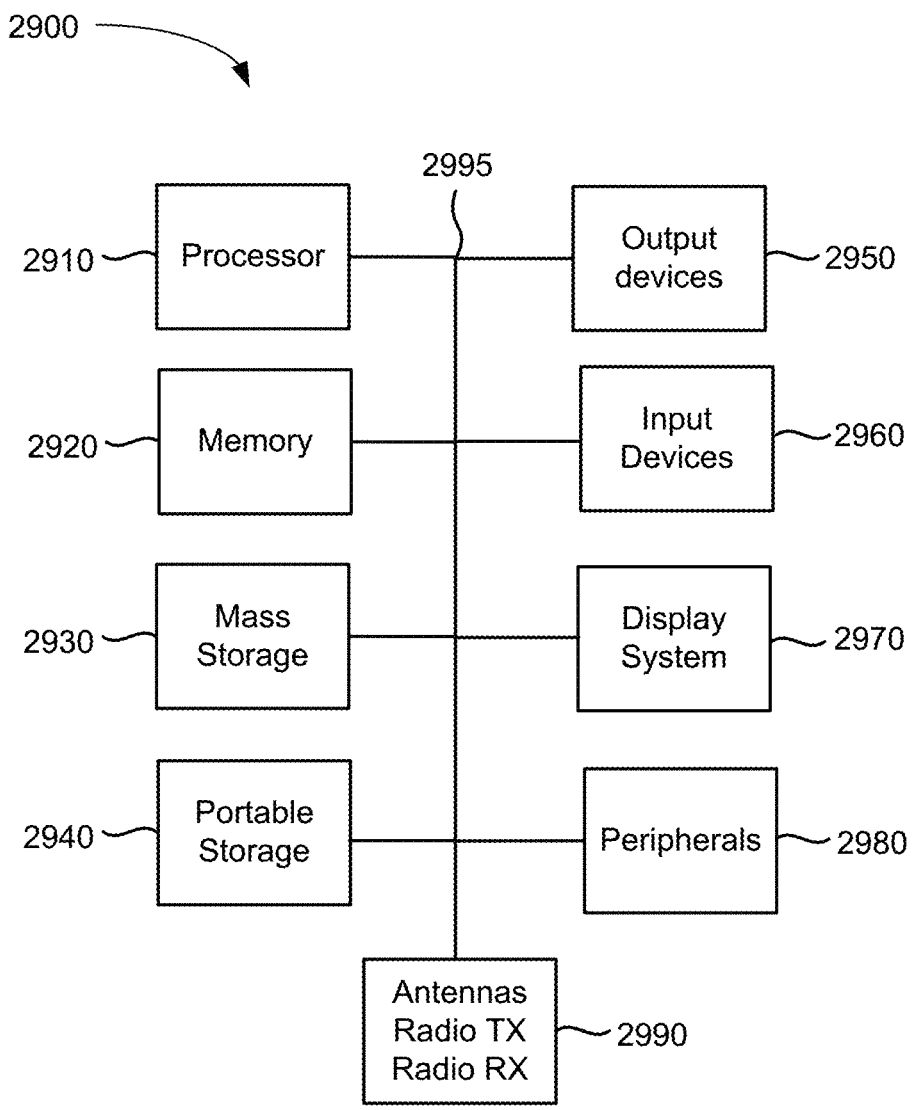
FIG. 29 is a block diagram of an exemplary system for implementing the present technology.

FIG. 29 is a block diagram of a computer system 400 for implementing the present technology. System 2900 of FIG. 29 may be implemented in the contexts of the likes of client 110, mobile device 120, computing device 130, network server 150, application server 160, and data store 170.

The computing system 2900 of FIG. 29 includes one or more processors 2910 and memory 2920. Main memory 2920 stores, in part, instructions and data for execution by processor 2910. Main memory 2910 can store the executable code when in operation. The system 2900 of FIG. 29 further includes a mass storage device 2930, portable storage medium drive(s) 2940, output devices 2950, user input devices 2960, a graphics display 2970, and peripheral devices 2980.

The components shown in FIG. 29 are depicted as being connected via a single bus 2990. However, the components may be connected through one or more data transport means. For example, processor unit 2910 and main memory 2920 may be connected via a local microprocessor bus, and the mass storage device 2930, peripheral device(s) 2980, portable or remote storage device 2940, and display system 2970 may be connected via one or more input/output (I/O) buses.

Mass storage device 2930, which may be implemented with a magnetic disk drive or an optical disk drive, is a non-volatile storage device for storing data and instructions for use by processor unit 2910. Mass storage device 2930 can store the system software for implementing embodiments of the present invention for purposes of loading that software into main memory 620.

Portable storage device 2940 operates in conjunction with a portable non-volatile storage medium, such as a compact disk, digital video disk, magnetic disk, flash storage, etc. to input and output data and code to and from the computer system 2900 of FIG. 29. The system software for implementing embodiments of the present invention may be stored on such a portable medium and input to the computer system 2900 via the portable storage device 2940.

Input devices 2960 provide a portion of a user interface. Input devices 2960 may include an alpha-numeric keypad, such as a keyboard, for inputting alpha-numeric and other information, or a pointing device, such as a mouse, a trackball, stylus, or cursor direction keys. Additionally, the system 2900 as shown in FIG. 29 includes output devices 2950. Examples of suitable output devices include speakers, printers, network interfaces, and monitors.

Display system 2970 may include a liquid crystal display (LCD), LED display, touch display, or other suitable display device. Display system 2970 receives textual and graphical information, and processes the information for output to the display device. Display system may receive input through a touch display and transmit the received input for storage or further processing.

Peripherals 2980 may include any type of computer support device to add additional functionality to the computer system. For example, peripheral device(s) 2980 may include a modem or a router.

The components contained in the computer system 2900 of FIG. 29 can include a personal computer, hand held computing device, tablet computer, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS or iOS, Android, and other suitable operating systems, including mobile versions.

When implementing a mobile device such as smart phone or tablet computer, or any other computing device that communicates wirelessly, the computer system 2900 of FIG. 29 may include one or more antennas, radios, and other circuitry for communicating via wireless signals, such as for example communication using Wi-Fi, cellular, or other wireless signals.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

The invention claimed is:

1. A method for training a dialogue learning model, comprising:
    presenting, via a user interface of a computing device, an utterance and a list of actions based on the utterance;
    receiving, via the user interface of the computing device, a selection of an action from the list of actions;
    receiving, via the user interface of the computing device, a designated span of the utterance;
    training the dialogue learning model based on the selected action and the designated span of the utterance to recognize an association between the selected action and natural language content in the designated span of the utterance; and
    generating one or more rules based on the association between the selected action and the natural language content.

2. The method of claim 1, wherein the list of actions includes two or more actions.

3. The method of claim 1, wherein the designated span of the utterance is less than an entirety of the utterance.

4. The method of claim 1, wherein the utterance is a user utterance from a natural language conversation between a user and an automated assistant.

5. The method of claim 1, wherein the selected action is one of a plurality of actions for responding to the utterance, and the designated span of the utterance is one of a plurality of designated spans of the utterance each corresponding to an action of the plurality of actions.

6. The method of claim 1, wherein the natural language content includes one or more tokens within the utterance.

7. The method of claim 1, wherein the one or more rules include a rule for recognizing whether the selected action is applicable based on the natural language content.

8. The method of claim 1, wherein the one or more rules include a rule for determining parameters of the selected action based on the natural language content.

9. The method of claim 1, wherein the one or more rules include a rule for generating an agent utterance describing the selected action.

10. The method of claim 1, wherein the dialogue learning model is a grammar induction learning model and the one or more rules are grammar rules derived based on the association by the grammar induction learning model.

11. The method of claim 1, wherein each of the one or more rules is associated with a set of features, and the training of the dialogue learning model includes assessing relevance of one or more features in the set of features, based on the association.

12. A method for training a dialogue learning model, comprising:
    receiving, from a computing device including a user interface, an utterance and a list of actions based on the utterance as presented via the user interface;
    receiving, from the computing device including the user interface, a selection of an action from the list of actions as selected via the user interface;
    receiving, from the computing device including the user interface, a designated span of the utterance as selected via the user interface;
    training the dialogue learning model with the selected action and the designated span of the utterance to recognize an association between the selected action and the designated span of the utterance; and
    generating one or more rules based on the association.

13. The method of claim 12, wherein the list of actions includes two or more actions.

14. The method of claim 12, wherein the designated span of the utterance is less than an entirety of the utterance.

15. A computer system, comprising:
    a processor; and
    a storage device holding instructions executable by the processor to:
        receive, at a computing device, a selection of an action from a list of actions based on an utterance;
        automatically train a dialogue learning model with the action and a designated span of the utterance less than an entirety of the utterance to recognize an association between the selected action and natural language content in the designated span of the utterance; and
        generating one or more rules based on the association between the selected action and the natural language content.

16. The computer system of claim 15, wherein the list of actions includes two or more actions.

17. The computer system of claim 15, wherein the utterance is a user utterance received via a user interface.

18. The computer system of claim 15, wherein the action is one of a plurality of actions for responding to the utterance, and the designated span of the utterance is one of a plurality of designated spans of the utterance each corresponding to an action of the plurality of actions.

* * * * *